US010590241B2

(12) United States Patent
Wetzel et al.

(10) Patent No.: US 10,590,241 B2
(45) Date of Patent: Mar. 17, 2020

(54) TWO-DIMENSIONAL POLYMERS COMPRISED OF A COMBINATION OF STIFF AND COMPLIANT MOLECULAR UNITS

(71) Applicant: U.S. Army Research Laboratory ATTN: RDRL-LOC-I, Adelphi, MD (US)

(72) Inventors: Eric D. Wetzel, Baltimore, MD (US); Emil Jose Sandoz-Rosado, Baltimore, MD (US); Todd David Beaudet, Aberdeen, MD (US); Radhakrishnan Balu, Columbia, MD (US); John Joseph La Scala, Wilmington, DE (US); Dominika Nini Lastovickova, Aberdeen, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 172 days.

(21) Appl. No.: 15/434,391

(22) Filed: Feb. 16, 2017

(65) Prior Publication Data
US 2017/0240706 A1     Aug. 24, 2017

Related U.S. Application Data

(60) Provisional application No. 62/296,892, filed on Feb. 18, 2016.

(51) Int. Cl.
| C08G 73/10 | (2006.01) |
| C08G 73/18 | (2006.01) |
| C08G 73/22 | (2006.01) |
| C08G 63/00 | (2006.01) |
| C08G 63/78 | (2006.01) |
| C08G 63/133 | (2006.01) |
| F41H 5/08 | (2006.01) |
| C08G 75/32 | (2006.01) |
| C08G 63/127 | (2006.01) |
| C08G 69/32 | (2006.01) |
| C08G 73/02 | (2006.01) |
| C08G 63/06 | (2006.01) |

(52) U.S. Cl.
CPC ......... *C08G 73/1067* (2013.01); *C08G 63/00* (2013.01); *C08G 63/065* (2013.01); *C08G 63/127* (2013.01); *C08G 63/133* (2013.01); *C08G 63/78* (2013.01); *C08G 69/32* (2013.01); *C08G 73/028* (2013.01); *C08G 73/18* (2013.01); *C08G 73/22* (2013.01); *C08G 75/32* (2013.01); *F41H 5/08* (2013.01)

(58) Field of Classification Search
None
See application file for complete search history.

(56) References Cited

U.S. PATENT DOCUMENTS

| 7,582,798 B2 | 9/2009 | Yaghi et al. | |
| 2010/0143693 A1 | 6/2010 | Yaghi et al. | |
| 2014/0031448 A1* | 1/2014 | King | C08G 61/02 522/181 |

OTHER PUBLICATIONS

Allen, S. R.; Roche, E. J.; Bennett, B.; Molaison, R., "Tensile deformation and failure of ploy (p-phenylene terephtalamide) fibers," Polymer 1992, 33, (9), 1849-1854.
Lee, C.; Wei, X.; Kysar, J. W.; Hone, J., "Measurement of the Elastic Properties and Intrinsic Strength of Monolayer Graphene," Science 2008, 321, (5887), 385-388.
Pei, Q.; Zhang, Y.; Shenoy, V., "A molecular dynamics study of the mechanical properties of hydrogen functionalized graphene," Carbon 2010, 48, (3), 898-904.
Cranford, S. W.; Buehler, M. J., "Mechanical properties of graphyne," Carbon 2011, 49, (13), 4111-4121.
Enyashin, A. N.; Ivanovskii, A. L., "Graphene allotropes," physica status solidi (b) 2011, 248, (8), 1879-1883.
Lee, J.-H.; Loya, P. E.; Lou, J.; Thomas, E. L., "Dynamic mechanical behavior of multilayer graphene via supersonic projectile penetration," Science 2014, 346, (6213), 1092-1096.
Zhang P.; Ma, L.; Fan, F.; Zeng, Z.; Peng, C.; Loya, P. E.; Liu, Z.; Gong, Y.; Zhang, J.; Zhang, X., "Fracture toughness of graphene," Nature Communications 2014, 5.
Hwangbo, Y.; Lee, C.-K; Kim, S.-M.; Kim, J.-H.; Kim, K.-S.; Jang, B.; Lee, H.-J.; Lee, S.-K; Kim, S.-S.; Ahn,J.-H., "Fracture Characteristics of Monolayer CVD-Graphene," Scientific reports 2014, 4.
Li, Y.; Datta, D.; Li, Z.; Shenoy, V. B., "Mechanical properties of hydrogen functionalized graphene allotropes," Computational Materials Science 2014, 83, 212-216.
Zhang, Z; Wang, X; Lee, J. D., "An atomistic methodology of energy release rate for graphene at nanoscale," Journal of Applied Physics 115, 114314 (2014).
Wetzel, E. D.; Balu, R.; Beaudet, T. D., "A theoretical consideration of the ballistic response of continuous graphene membranes," Journal of the Mechanics and Physics of Solids 2015, 82, (0), 23-31.
Sandoz-Rosado, E.; Beaudet, T. D.; Balu, R.; Wetzel, E. D., "Designing molecular structure to achieve ductile fracture behavior in a stiff and strong 2D polymer 'graphylene,'" Nanoscale, 2016, 8, 10947-10955.

* cited by examiner

Primary Examiner — Ana L. Woodward
(74) Attorney, Agent, or Firm — Eric B. Compton

(57) ABSTRACT

A family of new and novel molecules for mechanically superior two-dimensional (2D) polymers is described herein. By combining stiff carbon-containing cyclic polymer nodal units with more compliant linear polymer bridge units in an ordered, 2D repeating molecular structure it is possible to tailor the mechanical properties of 2D polymers and their assemblies to provide high stiffness, strength, and toughness. Furthermore, the inherent dimensionality of 2D polymers and their ability to be stacked into ordered and chemically interactive ensembles gives them inherent benefits in a variety of barrier and structural applications over current stiff and strong linear polymer technologies.

7 Claims, 15 Drawing Sheets

$m = 3$ $m = 4$ $m = 5$ $m = 6$

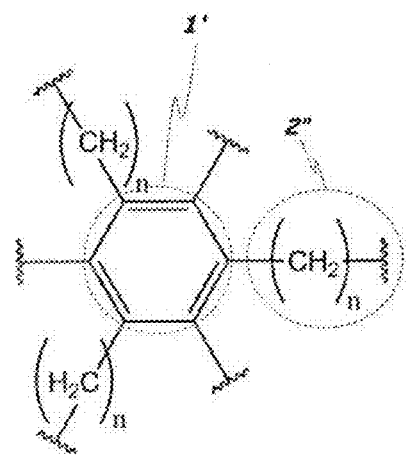
FIG. 2
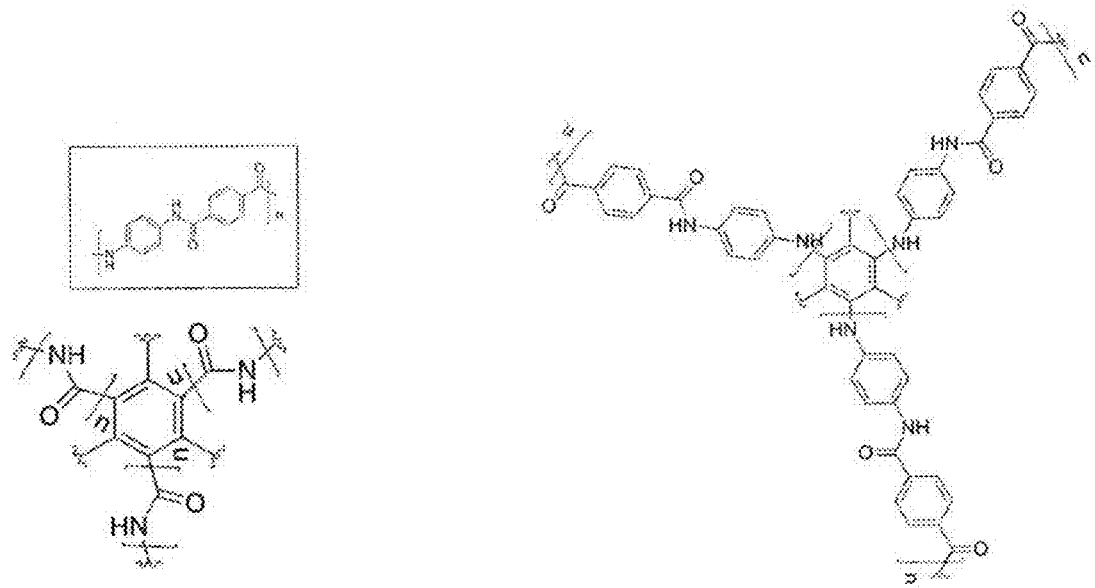
FIG. 3A
FIG. 3B

Reaction 1

Reaction 2

Reaction 3

General preparation procedure for 2D polyamides.

Generalized synthesis procedures to prepare 2D polybenzoxazoles.

Generalized synthesis procedures to prepare 2D polybenzothiazoles and polybenzimidizoles Generalized synthesis procedures to prepare 2D polyhydroquinone-diimidazopyridine Generalized synthesis procedures to prepare 2D polyesters Generalized synthesis procedures to prepare 2D polyamic acids.

TWO-DIMENSIONAL POLYMERS COMPRISED OF A COMBINATION OF STIFF AND COMPLIANT MOLECULAR UNITS

CROSS REFERENCE TO RELATED APPLICATION(S)

This application claims the benefit of U.S. Provisional Patent Application No. 62/296,892 filed Feb. 18, 2016, herein incorporated by reference in its entirety for all purposes.

GOVERNMENT INTEREST

The invention described herein may be manufactured, used, and licensed by or for the United States Government.

BACKGROUND OF THE INVENTION

I. Field of the Invention

The present invention relates generally to polymer compositions, and in particular those having a two-dimensional (2D) repeating structure.

II. Description of Related Art 2D materials offer unprecedented mechanical properties that can potentially be exploited for structural and barrier applications.

Graphene is one example of a 2D material. It is a fullerene compound consisting of solely bonded carbon atoms. The extraordinary in-plane stiffness and intrinsic strength of graphene in its pristine state have made it a desirable candidate as a structural material.

Graphene has the theoretical potential to enable ballistic barriers that have 10-100× less weight than barriers composed of Kevlar with the same ballistic limit, and has also demonstrated a specific kinetic energy of penetration an order of magnitude greater than steel and 2-3× greater than Kevlar, as measured by microscale ballistic experiments. However, because graphene is a network of very stiff $sp^2$ double bonds, it is highly resistant to fracture initiation but, once formed, a crack will propagate in a brittle manner. This brittle behavior may limit graphene's potential as a structural engineering material, as local failure due to a flaw or stress concentration is likely to trigger a sudden and catastrophic global failure.

Other 2D polymers have been recently theorized. Graphyne and its related allotropes are composed strictly of extremely stiff carbon-carbon double and triple bonds, likely leading to brittle behavior. Graphane adds single hydrogen bonds to each carbon atom in graphene, resulting in a hexagonal network of $sp^3$ bonds. Studies have also examined carbon allotropes that are randomly hydrogen functionalized. Stiffness and strength in these graphene-like polymers have been incompletely reported, while fracture has not been directly studied in any of these systems.

Compared to linear polymers, such as those used in high performance fibers and textiles such as Nylon (polyamide), Kevlar (para-aramid), and Dyneema (ultrahigh molecular weight polyethylene), 2D polymers provide inherent mechanical advantages. Primarily, fibers composed of linear polymers possess stiffness and strength only along the fiber direction. Combining fibers of multiple orientations can provide effectively isotropic performance, but the effective isotropic stiffness and strength are approximately 50% lower than those of the longitudinal fiber properties.

Improved 2D compounds would be useful.

SUMMARY OF THE PRESENT INVENTION

A new family of novel 2D polymer compounds is described that maintains much of the stiffness of graphene, while being more resistant to fracture and more chemically interactive with other materials. This 2D covalent polymer network can be described as a well-ordered hybrid network of nodal carbon-containing cyclic unit (also referred to as a "node" or "nodal unit") that produce 3 or more bonds in the same plane connected by short linear bridge units (also referred to as "bridge units") that may contain one or more sp, $sp^2$ and/or $sp^3$ bonds but must maintain the overall planarity of the 2D polymer such that most bonds within the 2D polymer exist within a few bond lengths of a single plane, where a polymer is defined to be one or more repeat units potentially in combination with similar or different molecules. Herein, "hybrid" structures refer the combination of nodes and bridge units.

The cyclic nodal units provide stiffness while the linear bridge units contribute compliance to the overarching 2D polymer, and the use of a wider set of atoms and bond chemistries compared to graphene provides opportunities for a wider range of properties and applications.

According to embodiments, a two-dimensional (2D) polymer comprises a regular, repeating, two-dimensional 2D bond network of (i) a plurality of nodes comprised one or more carbon-containing cyclic nodal units which are joined by (ii) one or more linear polymer bridge units. The linear bridge units may include, but are not necessarily limited to: (a) polyethylene; (b) polyamide; (c) polyoxazole, polythiazole, or polyimidazole; (d) polyhydroquinone-diimidazopyridine; (e) a copolymer of 4-hydroxybenzoic acid and 6-hydroxy-2-naphthoic acid; (f) polyester; (g) polyacetylene; (h) polyamic acid; or (i) polyimide.

As apparent from the exemplary chemical formulas herein, the linear polymer bridge units may be formed of one or more co-polymer units defined by integer n, where n≥1. Thus, the length of the bridge units are proportional to the value of integer n.

In embodiments, for instance, where the nodal units comprise benzene and the bridge units comprise polyethylene, the polymer has the formula I:

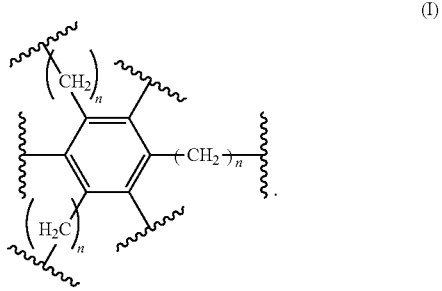

In other embodiments, for instance, where the nodal unit comprises benzene and the bridge units comprise an alkyl amide or aromatic amide, the polymer may have the formula II, III, IV or V:

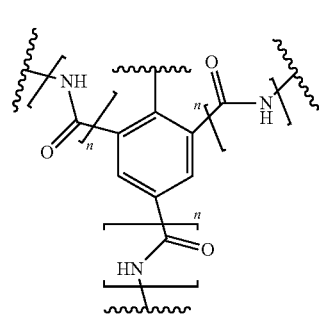
(II)
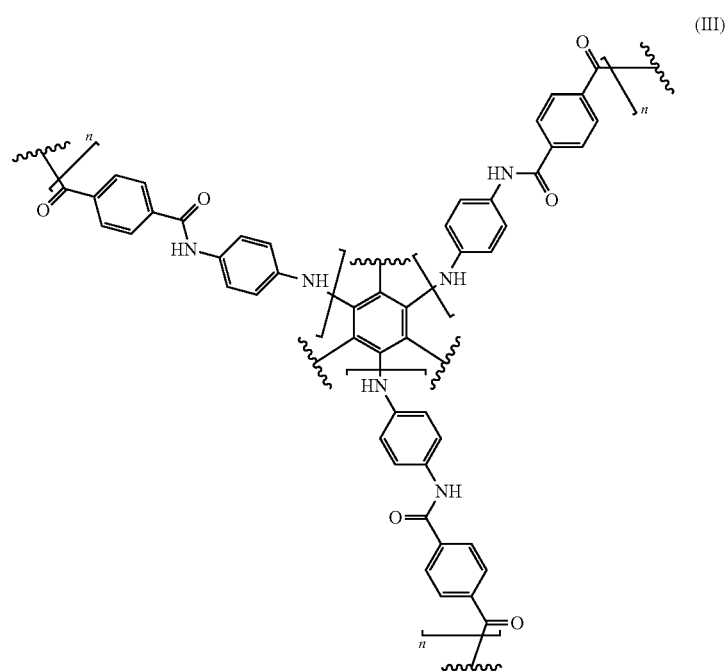
(III)
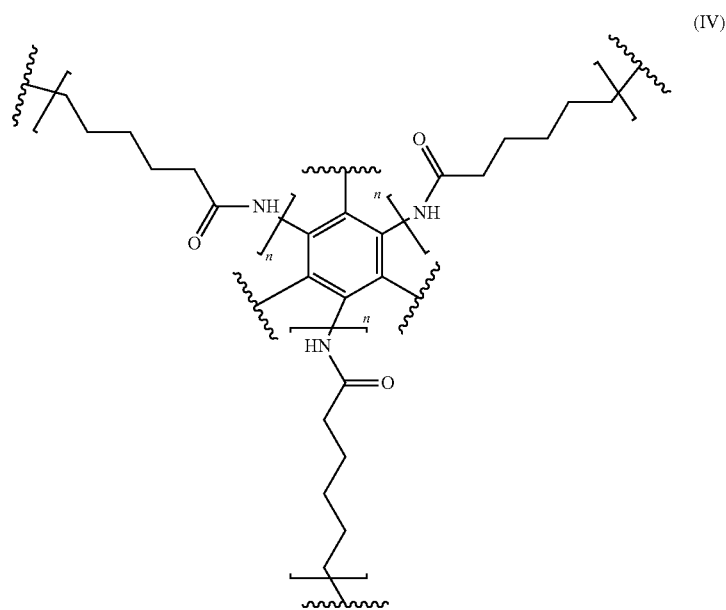
(IV)

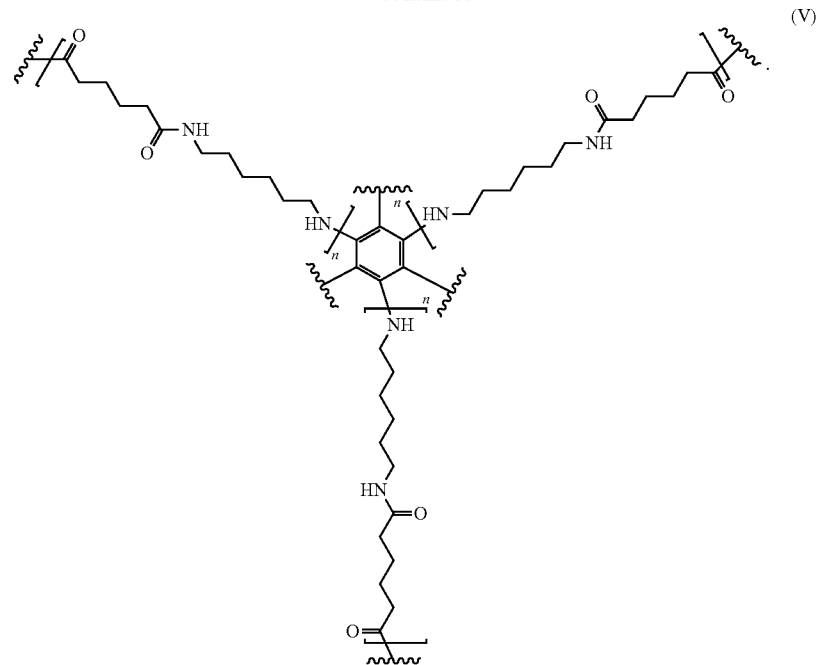
(V)
In additional embodiments, for instance, where the bridge units comprise polybenzoxazole, polybenzothiazole or polybenzimidazole, the polymer may have the formula VI, VII, VIII, IX, X or XI:
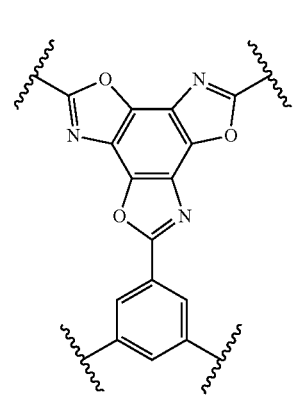
(VI)
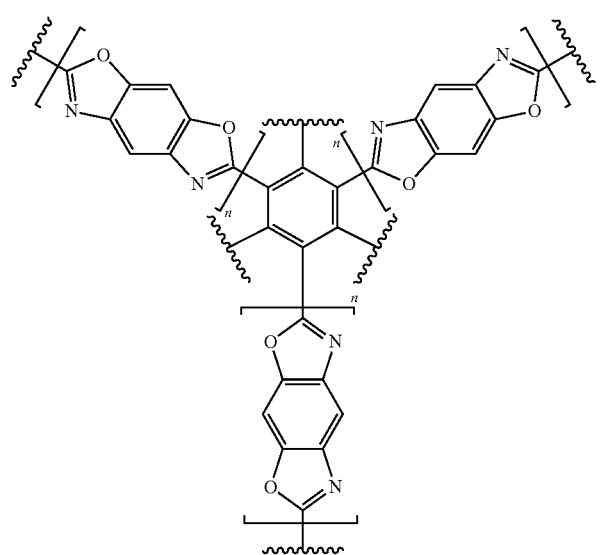
(VII)

-continued
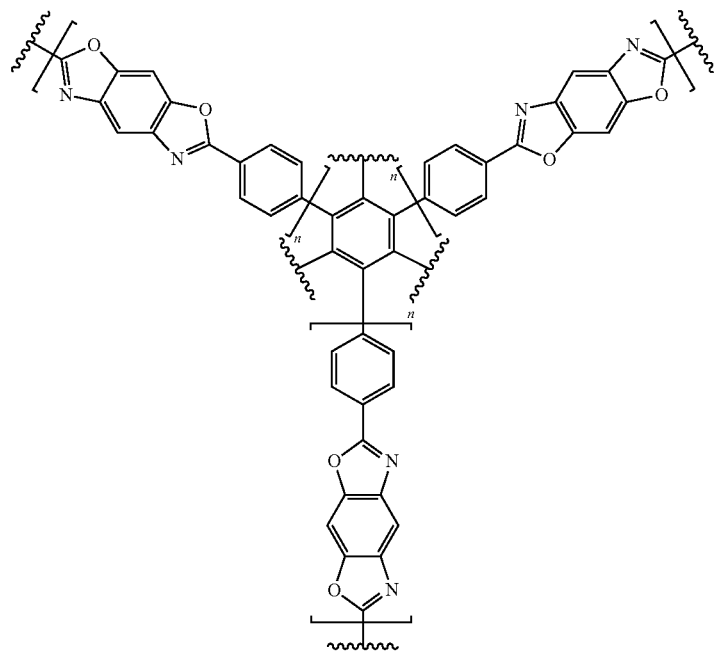
(VIII)
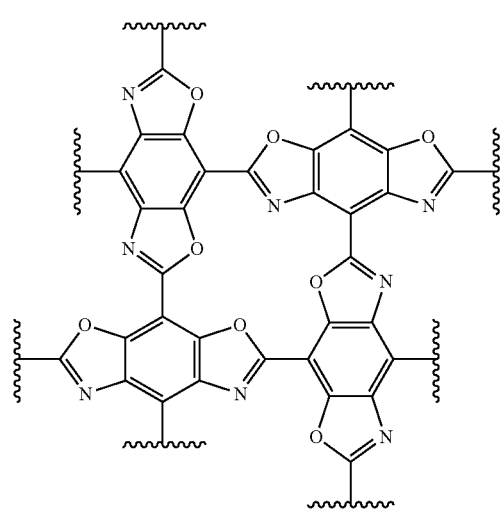
(IX)

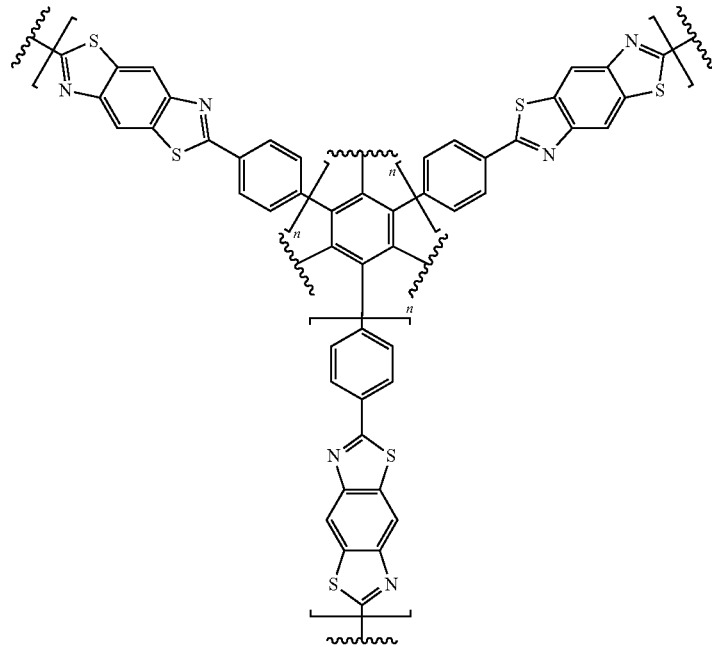
(X)
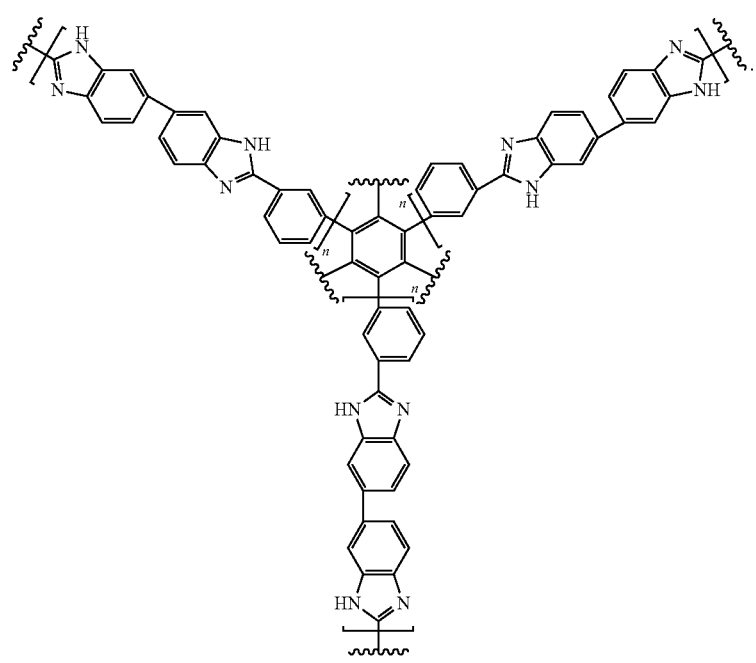
(XI)

In further embodiments, for instance, where the nodal units comprise benzene and the bridge units comprise polyhydroquinone-diimidazopyridine, the polymer may have the formula XII:

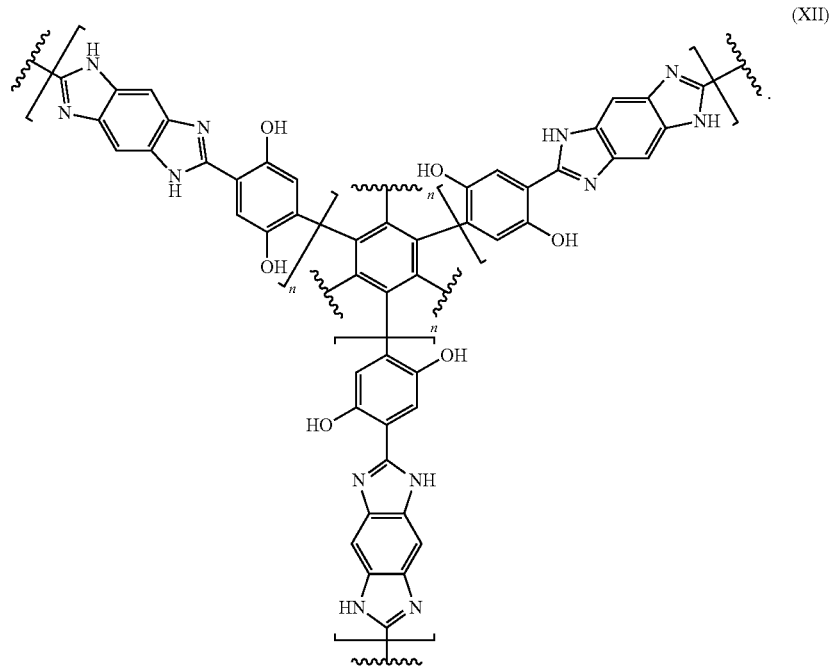

(XII)

In yet other embodiments, for instance, where the nodal units comprise benzene and the bridge units comprise a copolymer polyester of 4-hydroxybenzoic acid and 6-hydroxy-2-naphthoic acid, and the polymer may have the chemical formula XIII, XIV or XV:

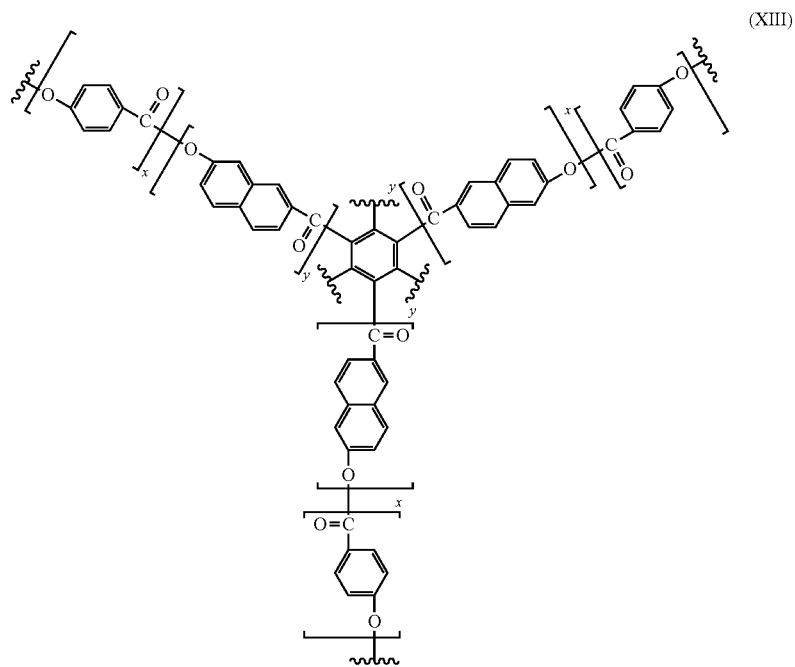

(XIII)

-continued
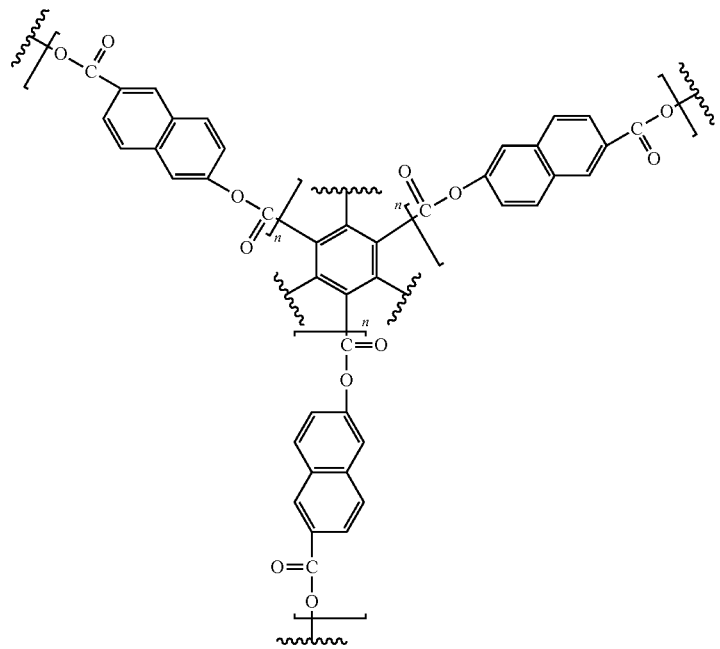
(XIV)
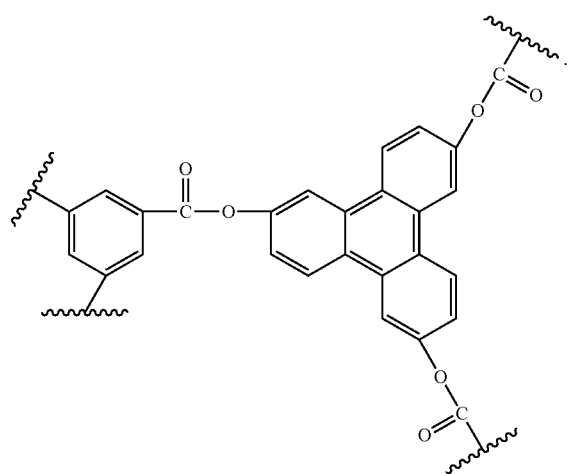
(XV)

In even further embodiments, for instance, where the nodal units comprise benzene and the bridge units comprise polyester, the polymer may have the formula XVI or XVII:
In more embodiments, for instance, where the nodal units comprise benzene and the bridge units comprise polyacetylene, the polymer may have the formula XVIII or XIV:
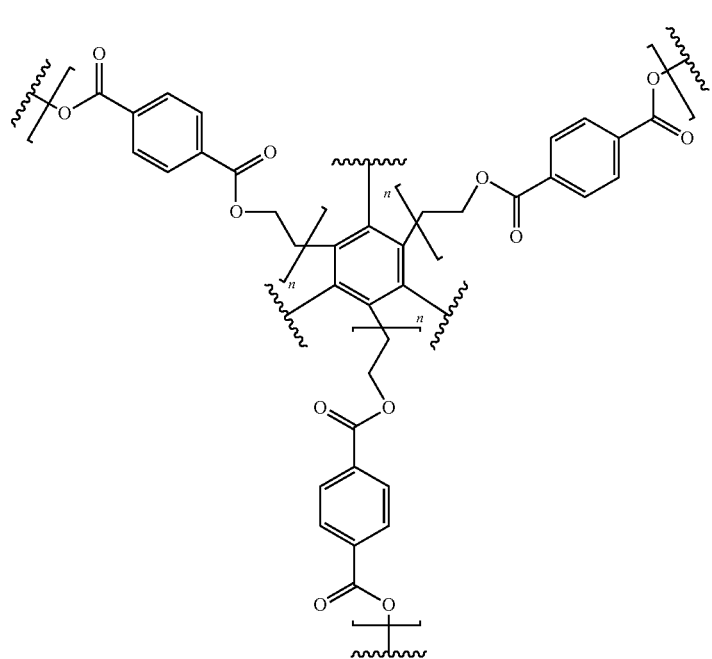
(XVI)
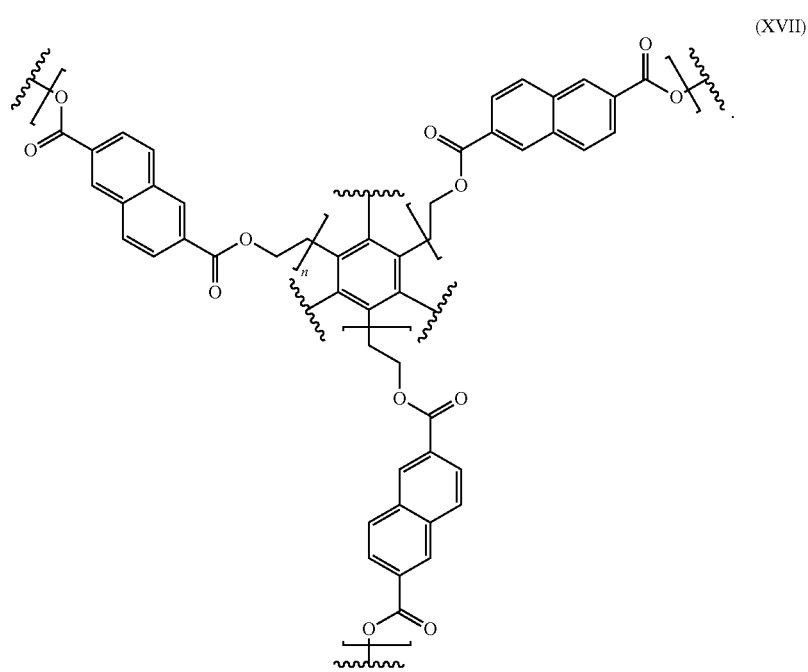
(XVII)

(XVIII)
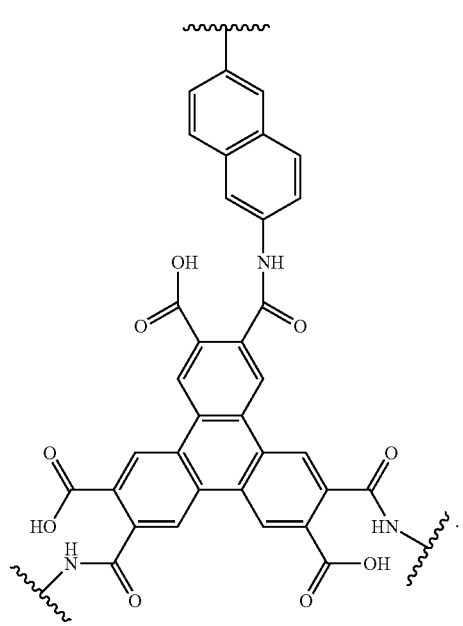
(XXI)
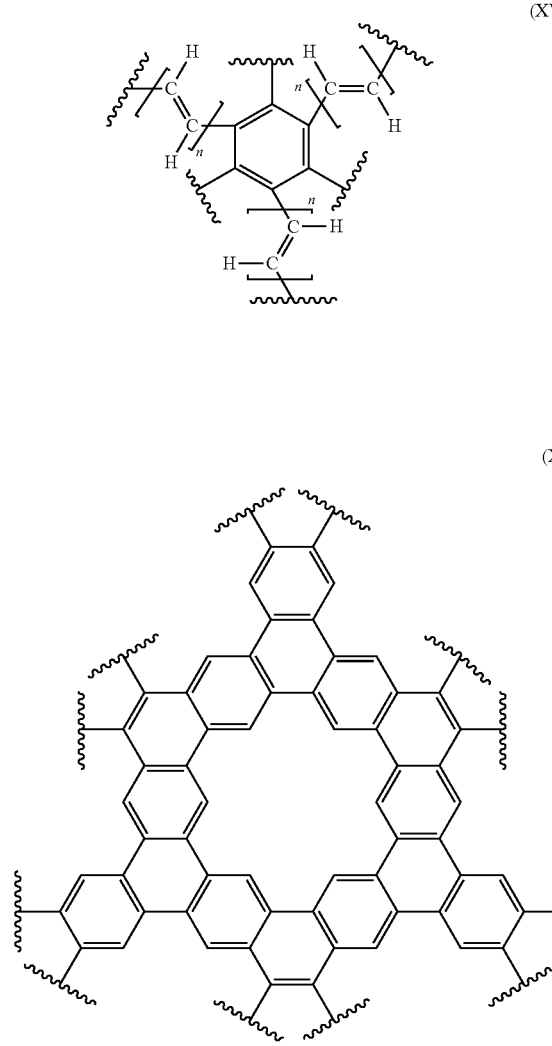
(XIX)
In even more embodiments, for instance, where the nodal units comprise benzene and the bridge units comprise polyamic acid, the polymer may have the formula XX or XXI:
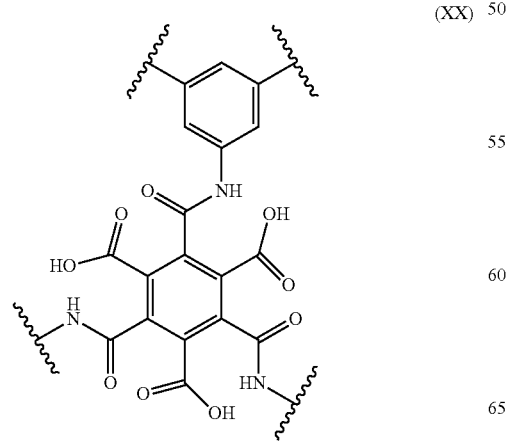
(XX)
In additional embodiments, for instance, where the nodal units comprise benzene and the bridge units comprise polyimide, the polymer may have the formula XXII or XXIII:
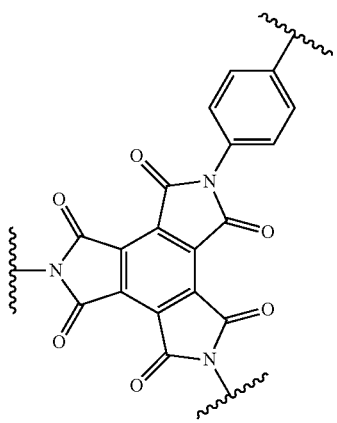
(XXII)
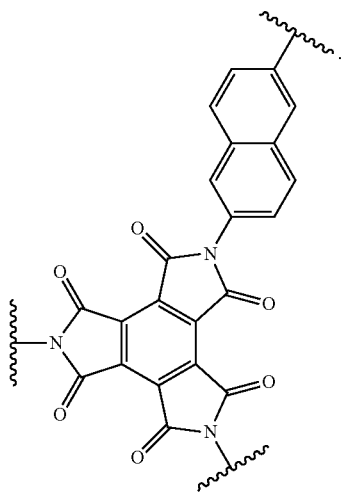
(XXIII)

Generally, the 2D polymer embodiments formed of: a regular, repeating, two-dimensional 2D bond network of (i) a plurality of nodes comprised one or more carbon-containing cyclic nodal units which are joined by (ii) one or more linear polymer bridge units may be generally characterized by four key parameters. First, (a) the bridge units are between 0.1-100 nm long. Second, (b) the nodal units produce 3 or more bonds in the same plane. Third, (c) the bridge units maintain the overall planarity of the 2D polymer such that the majority of bonds (preferably 90% or greater) within the 2D polymer exist within a 3 carbon bond distance of a single plane. Fourth, (d) the polymer has a degree of polymerization greater than 50 nm in both lateral in-plane dimensions.

For instance, the nodal units may include, but are not necessity limited to, one of more: benzene, borozene, silicene, oxazole, thiazole, or imidazole rings. The bridge units may include, but are not necessarily limited to: amide, benzoxazole, benzothiazole, benzimidazole or polyhydroquinone-diimidazopyridine molecular units. More particularly, the bridge unit may include one or more polymer, co-polymer, or sub-unit of: polyethylene, p-phenylene terephthalamides, poly-metaphenylene isophthalamides, polyamidobenzimidazole, polybenzoxazole, polybenzothiazole, polybenzimidazole, polyhydroquinone-diimidazopyridine, cellulose, polyamide, polyester, polyimide, polyethylene terephthalate, polyethylene naphthalate, 4-hydroxybenzoic acid, 6-hydroxy-2-naphthoic acid, polyacetylene, polyacrylonitrile, and/or poly(1-lactid-co-caprolactone). In addition, the bridge units may be capable of hydrogen bonding with similar 2D polymer molecules. This provides practical advantages with respect to processing, synthesis, and mechanical performance.

It may be advantageous for many embodiments, that the 2D polymer forms a liquid crystal in solution or as a melt. Exemplary polymer compositions according to embodiments yield results in modulus and strength higher than that of Kevlar with toughness higher than that of graphene.

Methods of producing the 2D polymer compositions in accordance with embodiments generally include: providing a first monomer comprising three or more functional groups per molecule to functional as the nodal units; providing a second monomer comprising two reactive groups per molecule to function as the bridge units; and reacting the first monomer with the second monomer to form the regular, repeating, two-dimensional 2D bond network. In some instances, the second monomer may be formed of two or more co-polymers; thus, the method further includes: proving at least two co-polymers having two different functional groups; and reacting the two co-polymers so as to produce the second monomer. In further refinements, polyamic acid molecular units may be formed during 2D polymerization that enable extended solvency of the 2D polymer in solution as a function of molecular weight. And the polyamide acids are then removed from solution and crystallized into solids via imidization.

The 2D polymer composition embodiments according to the present invention have continuous bond networks that extend in all directions in the material plane, so that they can demonstrate high stiffness (at least 10 GPa, preferably greater than 100 GPa) and strength (at least 1 GPa, preferably at least 10 GPa) in all directions. Thus, in contrast to the known or theorized 2D polymer compositions, 2D polymer composition embodiments according to the present invention have two simultaneous and unique features; (1) the polymer linkers are shorter (quantitatively described in later sections) to encourage high stiffness and strength, and (2) the polymer linkers provide enhanced ductility (as quantified by engineering parameters such as fracture toughness, or observed qualitatively as meandering crack progression, crack bridging, and crack splitting). In addition to these features, the 2D polymer composition embodiments according to the present invention may also optionally exhibit inter-molecular hydrogen bonding, providing practical advantages with respect to processing, synthesis, and mechanical performance.

In addition to general structural advantages, these 2D polymer composition embodiments provide a specific advantage for ballistic barriers, with a theoretical 50% mass reduction compared to barriers composed of linear polymers of comparable stiffness and strength. Combining this inherent architectural advantage with the potential to create 2D polymers with stiffness and strength even higher than existing materials like Kevlar, these novel 2D materials have extraordinary potential as mechanical, structural, and ballistic materials.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 illustrates an example of a 2D polymer comprised of a plurality of nodes of single six-member carbon rings connected by bridge units of polyethylene according to embodiments of the present invention.

FIGS. 3A and 3B show examples of 2D polymers comprised of six-member carbon ring nodes interconnected by bridge units based on the p-phenylene terephthalamides according to embodiments of the present invention.

DETAILED DESCRIPTION

FIGS. 1A-1D depict schematics of a single layer of ordered hybrid structure of the 2D polymer networks according to embodiments of the present invention. As used herein, "2D polymer" refers to a highly regular, periodic, covalent bond network of atoms that are configured in a substantially planar arrangement. We will primarily discuss examples as single molecules, but the embodiment of the present invention includes single molecules, mono-layer sheets of molecules, stacks of molecules, and three-dimensional solid bodies composed of thousands or millions of arranged into a cooperative material ensemble.

Depicted are 2D polymer molecules with (but not limited to) (a) three (FIG. 1A), (b) four (FIG. 1B), (c) five (FIG. 1C), and (d) six (FIG. 1D) nearest neighbors, of integer m. A higher value of m generally is expected to lead to higher mechanical stiffness, strength, and ductility (when comparing on the basis of similar linker lengths) due to the higher molecular density and closer spacing of bonds. However, even structures with low values of m are potentially mechanically robust and have engineering utility.

Figure 1A:
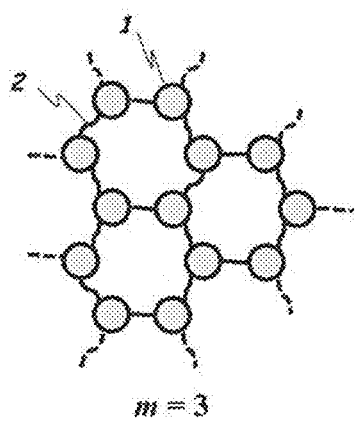
FIGS. 1A-1D depict schematics of ordered hybrid networks according to embodiments of the present invention.
Figure 1B:
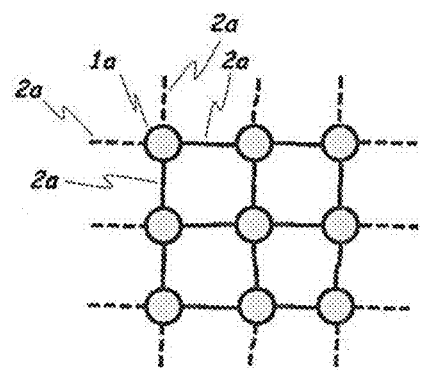
Figure 1C:
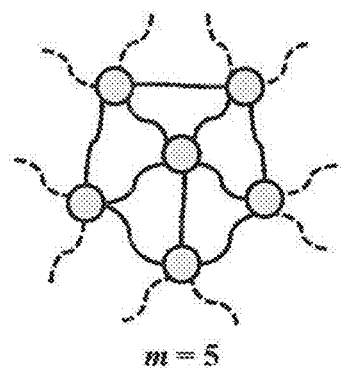
Figure 1D:
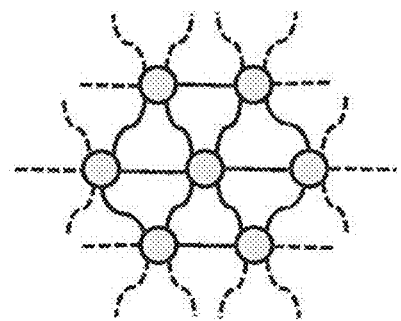

The nodes 1 are comprised of one or more carbon-containing cyclic units generally composed of $sp^2$ bonds along the polymer direction that produce three or more bonds in the same plane that continue through bridge units to other nodes, in total making up the 2D polymer. The connecting bridge units 2 are comprised of short linear chain extenders that may contain one or more $sp^2$ and/or $sp^3$ bonds. For some molecules, the bridge units 2 might contain all $sp^2$ bonds, all $sp^3$ bonds, or some combination of the two types of bonds, and/or other bonds, such as sp. FIG. 1B, for instance, shows that for a given node 1a, there are 4 corresponding bridge units 2a. The dashed-line bridge units indicate repeating structure ad infinitum in a plane.

Each node 1 can be comprised of one or more such cyclic units, such as, for instance, 6-atom benzene, borozene, or silicene rings; or 5-atom oxazole, thiazole, or imidazole rings. The nodes are interconnected by short 0.1-100 nm (or more preferably 0.1-10 nm) in length linear polymer bridge units comprised of at least one single bond.

A 2D material made entirely of cyclic units (such as graphene), while stiff and strong, can suffer from brittle fracture due to the stiffness of the rings. No bulk material is completely perfect, so the mechanical performance of a material at the bulk scale is going to be limited by its behavior with the presence of defects such as cracks, etc. meaning that fracture toughness is an important mechanical consideration. To improve fracture toughness our proposed 2D hybrid polymer contains short linear polymer linkers (in addition to the cyclic nodal units) with some single or $sp^3$ bonding to allow for freer bond rotation and deformation. This combination provides the overall material with excellent stiffness and fracture toughness. Bridge units 2 that are relatively short are considered.

If the bridge units are too long, they will decrease the stiffness of the overall structure significantly, mitigating the mechanical performance of the material. Bridge units 2 are generally preferred to be 0.1-100 nm in length, more preferably 0.1-10 nm in length. Some exemplary bridge units 2 include, for instance: (a) polyethylene; (b) polyamide; (c) polyoxazole, polythiazole, or polyimidazole; (d) polyhydroquinone-diimidazopyridine; (e) a copolymer of 4-hydroxybenzoic acid and 6-hydroxy-2-naphthoic acid; (f) polyester; (g) polyacetylene; (h) polyamic acid; and (i) polyimide.

Regularity of the structure is a critical feature for good mechanical performance. Consider a 2D material composed of stiff nodes bridged by linear polymer linkers of a wide range of lengths and bond character. When placed under a macroscopic boundary strain, the shorter and more-aligned bonds will be loaded preferentially relative to the longer, more coiled polymer linkers. This creates stress inhomogeneity, with high stress concentrations at certain bond locations that lead to early local failures that can cascade into global material failure. In contrast, a regular 2D bond network distributes the load more evenly amongst the comprising atomic bonds, minimizing stress concentrations and ensuring a high level of per-mass load-carrying efficiency.

FIG. 2 shows an example of a 2D polymer hybrid material comprised of single six-member carbon ring nodes connected to six nearest neighbors by polyethylene bridge units polyethylene $(-CH_2-)_n$ of integer n=1, 2, or more unit lengths. Thus, the length of the bridge units is proportional to the value of integer n. This structure is referred to herein as "graphylene." In particular, the repeating unit of this molecules is composed of benzene ring as the node 1' and polyethylene bridge units 2". The squiggly lines (~~) in the chemical formula represent imaginary cut-line of the bridge units, so that the structure depicted is a unit cell which is repeated p times to form a single molecule.

In this case, the cyclic nodes are six-member carbon rings that are entirely $sp^2$-bonded, providing very high stiffness, as seen in graphene. As n is increased, material toughness and ductility increase, while stiffness and strength decrease. For example, ab initio calculations (quantum mechanics density functional theory using PBE/ITZVP/D3 potentials implemented in CP2K software) predict that the stiffness decreases from 256 GPa at n=1, to 93 GPa at n=8 (Table 1, where 2D stiffness and stress values in units of N/m are converted to 3D stiffness and stress values by assuming an inter-layer spacing of 0.444 nm, and averaging properties between first-nearest neighbor and second-nearest neighbor directions). Graphene, in comparison, has an in-plane stiffness of around 1000 GPa. Considering fracture behavior, molecular dynamics calculations (using LAMMPS software with reactive empirical bond order [REBO] potential) comparing graphene with graphylene at n=2 predicts a higher critical fracture energy and dynamic energy release rate (Table 2). In addition, graphene fracture is predicted to be brittle under all loading rates and temperatures, leading to unstable crack propagation, consistent with experimental observations of graphene and graphite. In contrast, molecular dynamics calculations predict that graphylene at n=2 shows ductile behavior at room temperature, with stable, incremental crack growth that advances in a stepwise manner as sample loading increases.

In general, there will be a tradeoff between toughness and stiffness as "n" increases for a given 2D polymer chemistry. A different n value might be optimal for different applications. As the distance between nodes becomes very large, both the stiffness and in-plane density of the network becomes very low. Such low-density networks are less likely to have high mechanical properties, and also could be more difficult to form into aligned and chain-extended configurations. Therefore, bridge units are generally preferred to be 0.1-100 nm in length, more preferably 0.1-10 nm in length.

The carbon atoms in the polyethylene bridge units 2" are entirely $sp^3$ bonded. The value of p herein will be referred to as the degree of polymerization. The value of p in a given molecule could be as small as p=1 (a monomer) or up to, for example, $p=10^4$ (a molecule with a size nominally 100 nm×100 nm), $10^6$ (a molecule with a size nominally 1 μm×1 μm), or $10^6$ (a molecule with a size nominally 10 μm×10 μm).

FIGS. 3A and 3B show examples of 2D polymer hybrids comprised of six-member carbon ring nodes interconnected by bridge units based on the p-phenylene terephthalamides (also referred to as "para-aramid") linear polymer (depicted in the boxed inset in FIG. 3A), according to an embodiment of the present invention. The family of structures in FIGS. 3A and 3B is referred to herein as "graphamid." In FIG. 3A, the aromatic character of the para-aramid linear polymer is captured in the cyclic nodes of the 2D polymer structure, resulting in a highly compact structure. In FIG. 3B, the both the nodes and linkers have aromatic structures, and the linker can be propagated by increasing n to create greater spacing between nodes. As observed with graphylene, increasing n should lead to increased toughness, with decreasing stiffness and strength. The nodes can be swapped out for other cyclic units of varying size and configuration.

While the ordered, repeating structure is critical to the design to achieve superior mechanical performance in our 2D polymer hybrid material, it should be appreciated that all materials contain some degree of defects such as (but not limited to), unintended bridging, atomic omission, amorphous regions, etc. especially as the layers of 2D polymer are stacked.

Long-distance attraction will be an important facet in creating ensembles of 2D polymer molecules. Van der Waals forces, hydrogen bonding, Coulombic attraction, etc. are all mechanisms that can contribute to molecular attraction, and such forces can be tailored into 2D polymers via selection of proper atomic constituents and molecular functionalizations. For example, inter-molecular hydrogen bonding plays an important role in performance of para-aramid linear polymers; similarly, we can design 2D polymers with para-aramid linear bridge units (FIG. 3) to encourage bonding between finite-sized molecules. Long-distance attraction serves two primary purposes for 2D polymers, in a manner analogous to intermolecular attractions in linear polymers such as para-aramids. First, during processing of 2D polymers, it will be critical to drive molecular ensembles into highly oriented platelet arrays that form high strength and stiffness macroscopic films with in-plane isotropy. Long-distance attraction can encourage such orientation during solution processing by inducing a 2D lyotropic liquid crystalline state, i.e. a liquid crystalline state induced by dispersion in a solvent. Depositing this 2D liquid crystal, rather than a randomly oriented molecular solution, is much more likely to result in an oriented film. Once deposited, intermolecular interactions are expected to enhance the strength, stiffness, and toughness in 2D molecule ensembles, analogous to mechanisms identified in linear polymer ensembles. In contrast, in graphene such intermolecular forces are relatively small (limited to weak van der Waals interactions), which explains why graphene undergoes inter-layer cleavage so readily and without high energy absorption. We used first principles density functional theory to calculate interlayer shear modulus, strength, and energy barriers to slip for graphylene (n=2) and graphamid (n=1). Increasing hydrogen bonding increases the shear performance for 2D polymers as shown in Table 3.

For a solid material comprising an ensemble of many individual 2D polymer molecules, cooperative load sharing between molecules and, therefore, macroscopic mechanical stiffness, strength, and toughness, are enhanced via increased size (also quantified as molecular weight) of the individual molecules. Higher degrees of polymerization p will improve mechanical performance, with molecules having lateral dimensions greater than 50 nm being preferable. For 2D polymers with inter-molecular hydrogen bonding, such as graphamid, molecules 50-500 nm in lateral dimensions are likely to be sufficient to achieve mechanical properties on par with high performance engineering materials such as para-aramid fibers. For 2D polymers without inter-molecular hydrogen bonding, such as graphylene, molecules 100-1000 nm in lateral dimensions are likely to be necessary to achieve mechanical properties on par with high performance engineering materials such as ultrahigh molecular weight polyethylene fibers.

Figure 4A:
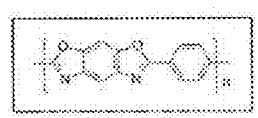
FIGS. 4A-4D shows multiple examples of 2D polymers with bridge units based on polybenzoxazole (PBO) polymer according to embodiments of the present invention.
Figure 4A:
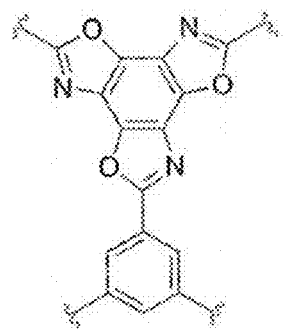
Figure 4B:
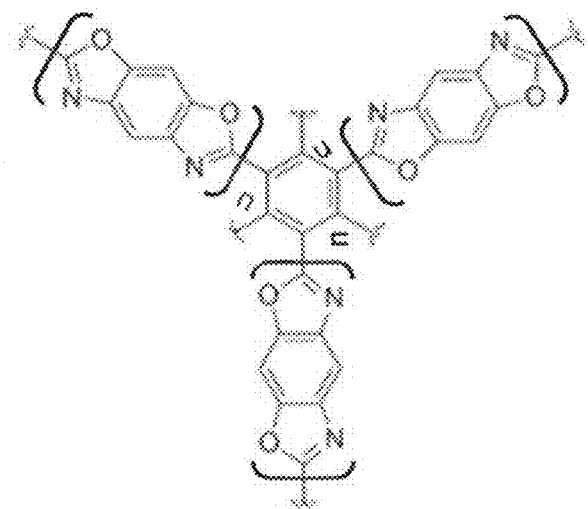
Figure 4C:
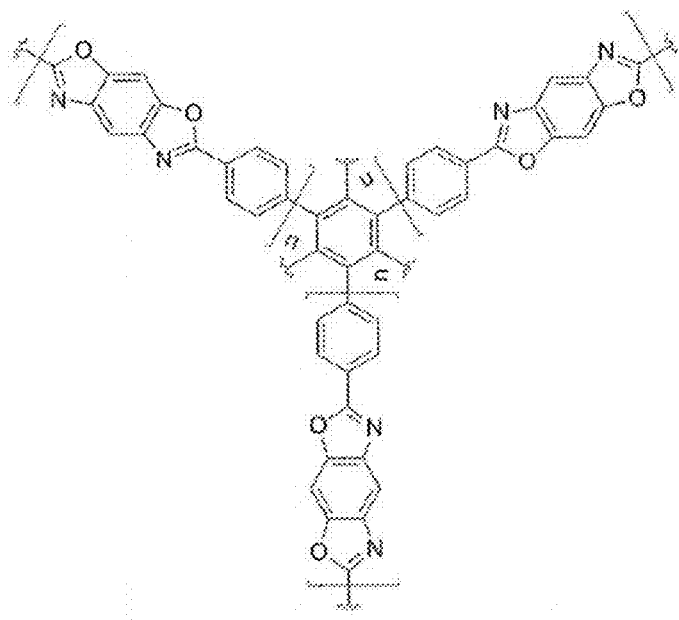

FIGS. 4A-4D show examples of 2D polymers inspired by the polybenzoxazole (PBO) linear polymer (boxed inset in FIG. 4A). FIGS. 4A, 4B, 4C, and 4D are PBO-inspired molecules with m=3, 6, 6, and 4.

Figure 5A:
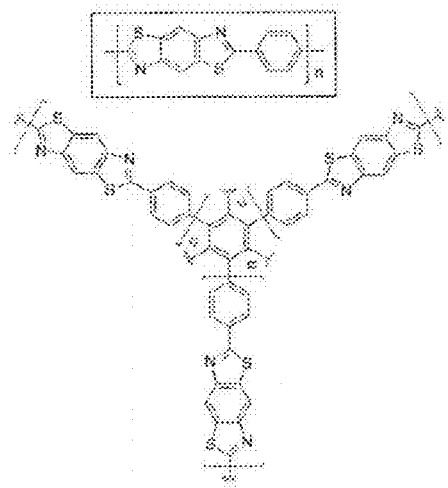
FIGS. 5A and 5B show examples of 2D polymers with bridge units based polybenzothiazole (PBT) and polybenzimidazole (PBI) according to embodiments of the present invention.
Figure 5B:
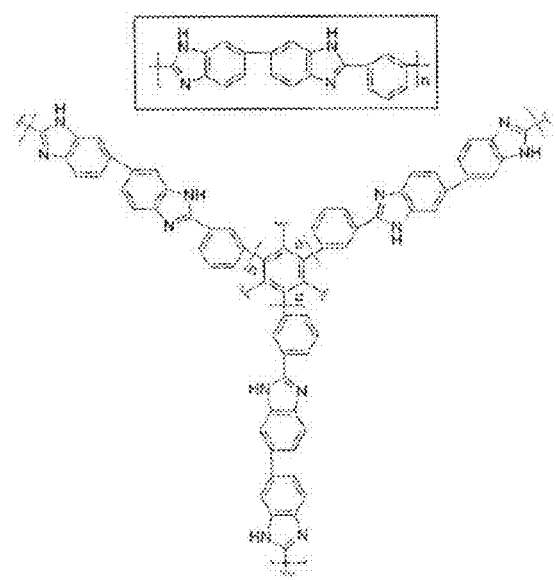

FIGS. 5A and 5B shows 2D polymers closely related to PBO linear polymers. FIG. 5A is based on the linear polymer polybenzothiazole (PBT) (boxed inset in FIG. 5a), and FIG. 5B is based on the linear polymer polybenzimidazole (PBI) (boxed inset in FIG. 5B).

The PBO polymer family (including variants including, but not limited to, PBT and PBI) has many advantages for 2D polymers such as those shown in FIGS. 4 and 5. The chemistry has been industrialized for linear polymers, providing foundational starting points for the creation of 2D PVO variants. The chemistry is known to result in very high mechanical stiffness and strength, with fibers made from linear PBO exceeding the mechanical properties of para-aramid and UHMWPE fibers. The linear molecules tend to form liquid crystals in solution, which if carried over into 2D polymers would enhance orientation during processing. And the high aromaticity of the linkers in the benzoxazole, behzothiazole, and benzimidazole families leads to molecules that are intrinsically planar. These polymers, like para-aramid polymers, are expected to also have high thermal, chemical, and environmental resistance.

Figure 6:
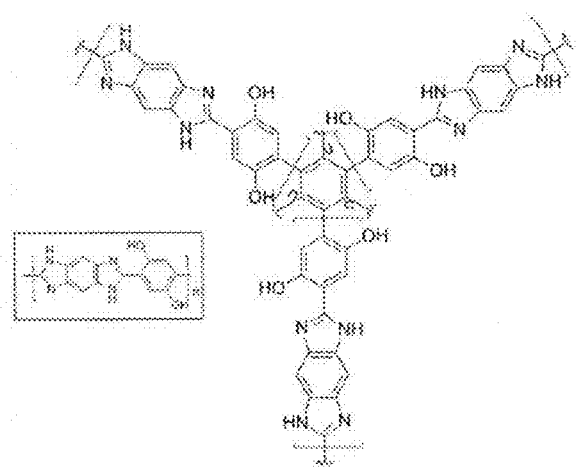
FIG. 6 shows an example of a 2D polymer with bridge units based on polymer polyhydroquinone-diimidazopyridine (PIPD) according to embodiments of the present invention.

FIG. 6 shows an examples of a 2D polymer with a bridge unit based on the linear polymer polyhydroquinone-diimidazopyridine (PIPD) (boxed inset in FIG. 6). 2D polymers based on PIPD are inspired by research efforts on linear PIPD, commercially named "M5" (Magellan Systems International). This polymer possesses very high hydrogen bonding, and as aligned linear polymer fibers shown to have very high strength and stiffness in both tension and axial compression. 2D versions of PIPD would also be expected to have very high hydrogen bonding, leading to excellent shear and compression properties, while also possessing very high tensile strength and stiffness.

Figure 7A:
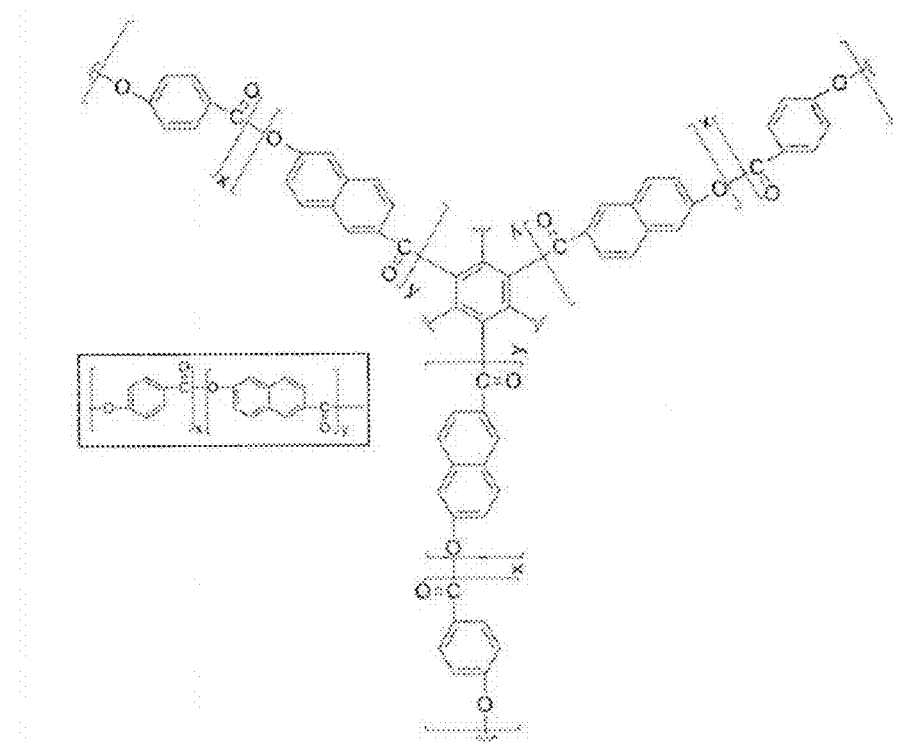
FIGS. 7A, 7B and 7C show examples of 2D polymers with bridge units based on a copolymer of 4-hydroxybenzoic acid (HBA) and 6-hydroxy-2-naphthoic acid (HNA) according to embodiments of the present invention.
Figure 7B:
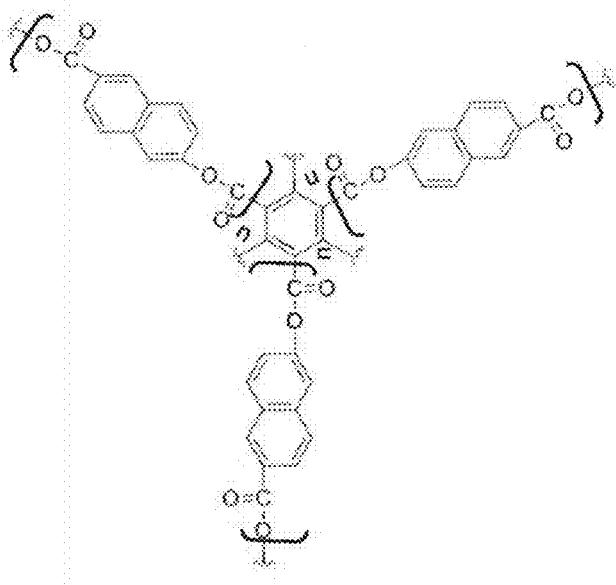
Figure 7C:
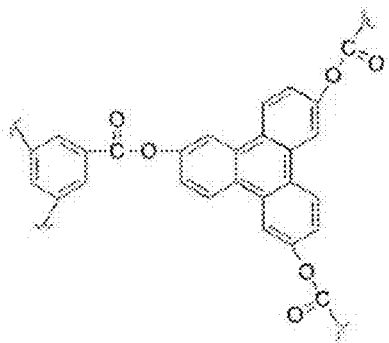

FIGS. 7A, 7B, and 7C shows examples of 2D polymers consisting of a random copolymer of 4-hydroxybenzoic acid (HBA) and 6-hydroxy-2-naphthoic acid (HNA). FIG. 7A is based on the general HBA/HNA copolymer (boxed inset of FIG. 7a), while FIG. 7B (m=6) and FIG. 7C (m=3) are specific variations based on the HBA/HNA copolymer.

The 2D polymers based on HBA/HNA copolymers are inspired by the commercial linear polymer fiber "Vectran" (Kuraray America Inc.). These linear polymers are thermotropic liquid crystals that enter into a liquid crystalline state within a certain temperature range. Because of their propensity to form a liquid crystalline state, these polymers are highly amenable to creating oriented, chain extended polymer fibers. Similarly, we expect that a 2D polymer based on HBA/HNA or other similar aromatic polyesters would have the potential to create high stiffness and strength films, and could form 2D thermotropic liquid crystals at an appropriate temperature.

Figure 8A:
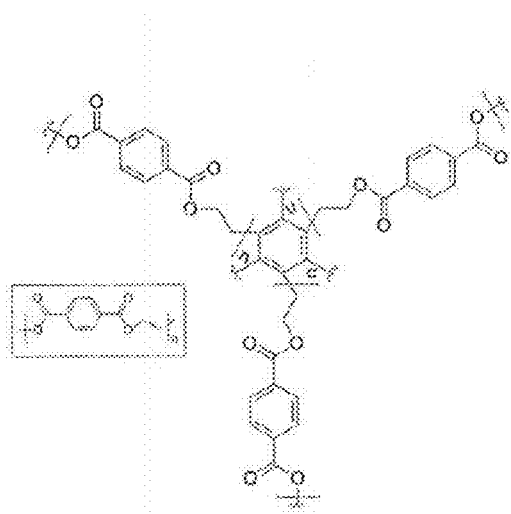
FIGS. 8A and 8B show examples of 2D polymers bridge units based on polyethylene terephthalate (PET) and polyethylene naphthalate (PEN) according to embodiments of the present invention.
Figure 8B:
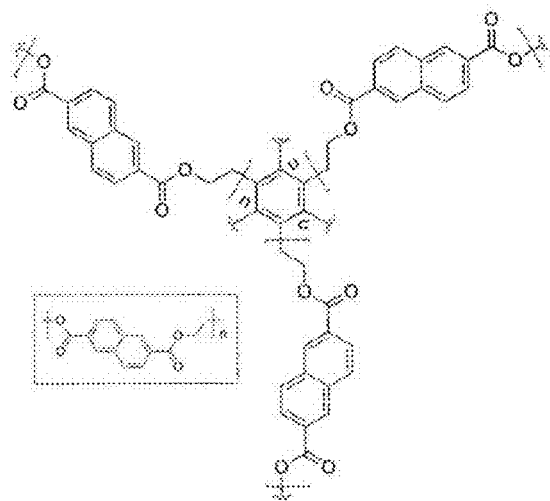

FIGS. 8A and 8B show examples of 2D polymers based on polyester linear polymers. FIG. 8A is based on the linear polymer polyethylene terephthalate (PET) (boxed inset in FIG. 8A), and FIG. 8B is based on the linear polymer polyethylene naphthalate (PEN) (boxed insert in FIG. 8B).

Figure 9A:
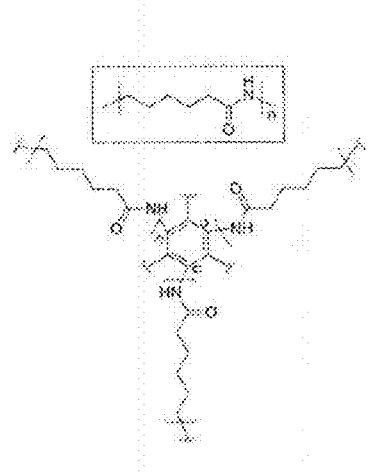
FIGS. 9A and 9B show examples of 2D polymers with Nylon bridge units according to embodiments of the present invention.
Figure 9B:
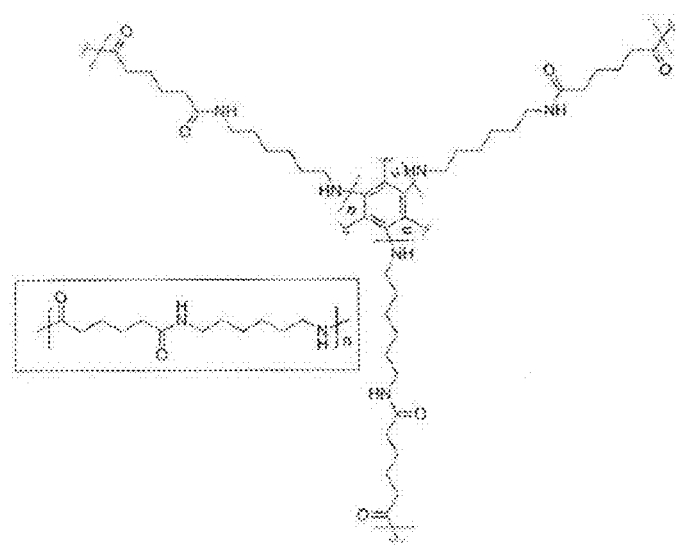

FIGS. 9A and 9B show examples of 2D polymers with Nylon bridge units. FIG. 9A is based on the linear polymer Nylon 6 (boxed inset in FIG. 9A), while FIG. 9B is based on the linear polymer Nylon 6,6 (boxed inset in FIG. 9B).

These 2D polymers based on polyesters (FIG. 8) and Nylon (FIG. 9) have the potential for high mechanical strength and stiffness. In addition, due to the extremely low cost and scalable production techniques currently in place for creating linear polyesters and Nylon, it is likely that industrialization of 2D polymers based on polyesters and Nylons could be cost effective and scalable.

In addition, 2D polymers also have considerable utility as electronic materials. A band gap over 1 eV is required for a material to function as a semiconducting material, suitable for creating a transistor for electronics applications. In wide-gap semiconductors the gap could be as large as 4 eV. Using density functional theory (DFT) calculations via Quantum Espresso software, the graphylene molecular configurations (FIG. 2) with n=1, 2, and 3 have bandgaps of around 3.5 eV. These materials, therefore, would function as wide bandgap materials. The chemical composition of the molecular configurations can be modified to adjust the proportion of hydrogen atoms to engineer the size of the bandgap. This may be done so using polyacetylene linkers, for instance.

Figure 10A:
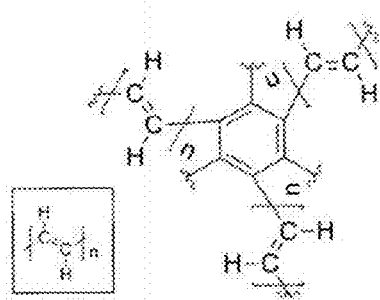
FIGS. 10A and 10B show examples of 2D polymers with polyacetylene bridge units according to embodiments of the present invention.
Figure 10B:
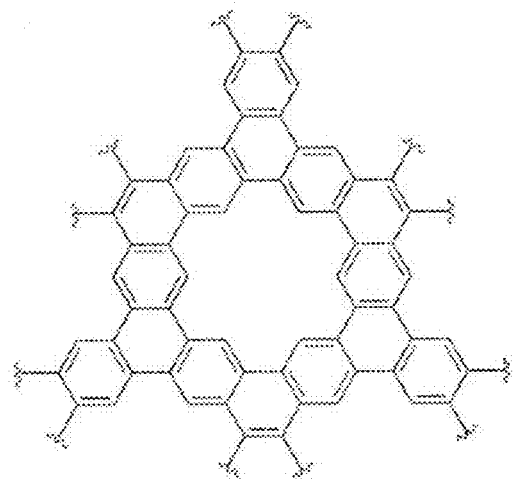

FIGS. 10A and 10B shows examples of 2D polymers with polyacetylene bridge units. FIG. 10A is based on linear polyacetylene (boxed inset in FIG. 10A) and has m=6, while FIG. 10B is a polyacetylene 2D polymer variant with m=3. DFT calculations predict, for the structure of FIG. 10A and n=1, a bandgap of 1.5 eV. This 2D polymer based on polyacetylene therefore could function in a manner similar to a traditional semiconducting material such as silicon. FIG. 10B shows a variant 2D polymer based on polyacetylene, in which the atoms are expected to be co-planar. This material would be expected to exhibit many of the interesting electronic properties observed in graphene, such as efficient electron transport, but with improved toughness and ductility compared to graphene.

Figure 11A:
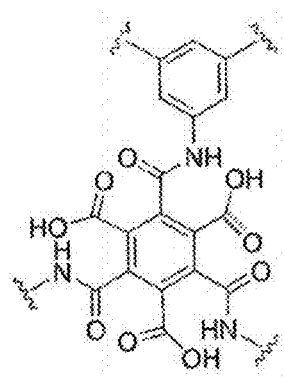
FIGS. 11A, 11B, and 11C show examples of 2D polymers with polyamic acid bridge units according to embodiments of the present invention.
Figure 11B:
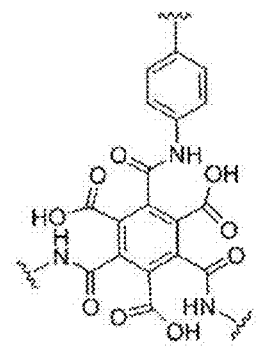
Figure 11C:
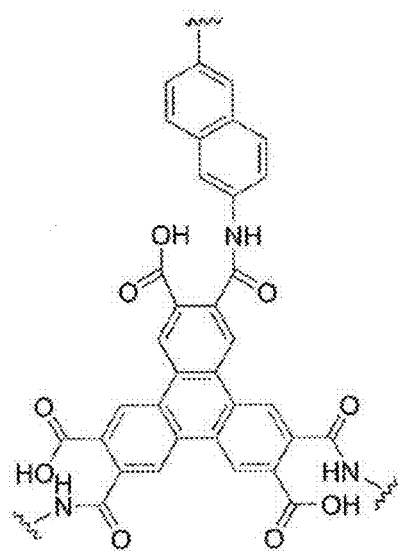

FIGS. 11A, 11B and 11C show examples of 2D polymers with polyamic acid bridge units. FIG. 11A is based on two tri-functional (m=3) units, while FIG. 11B represents a node of m=3 chain extended with a di-functional unit of m=2, and FIG. 11C shows another example of a node with m=3 chain extended with a di-functional unit of m=2. 2D polymers based on polyamic acids have the potential to be soluble in polar solvents to high polymer molecular weights because of the acid functionality, which should enable high molecular weight development and reduced defect concentration, which ultimately will result in higher strength and modulus.

Figure 12A:
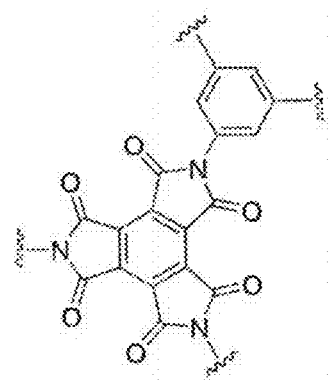
FIGS. 12A, 12B, and 12C shows examples of polyimide 2D polymers according to embodiments of the present invention.
Figure 12B:
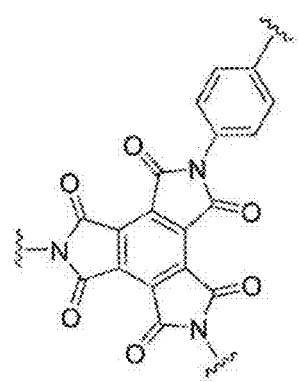

FIGS. 12A and 12B show: Polyimide 2D polymers. FIG. 12a is based on two tri-functional (m=3) units, while FIG. 11b represents a node of m=3 chain extended with a di-functional unit of m=2, and FIG. 11c shows another example of a node with m=3 chain extended with a di-functional unit of m=2. 2D polymers based on polyimides can be formed by imidization of polyamic acids. Upon imidization, these polymers should precipitate out of solution to form crystalline 2D polymers. As a result of the bicyclic ring that is formed upon imidization, these polymers have the capacity to be stronger and stiffer than many of the other polymers identified.

Figure 13A:
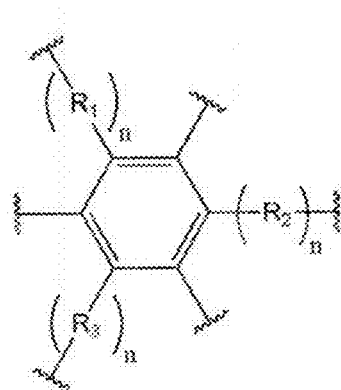
FIGS. 13A and 13B show line-angle chemical formulas of example of a single cyclic ring node of 2D polymer and a multiple cyclic ring node according to embodiments of the present invention.
Figure 13B:
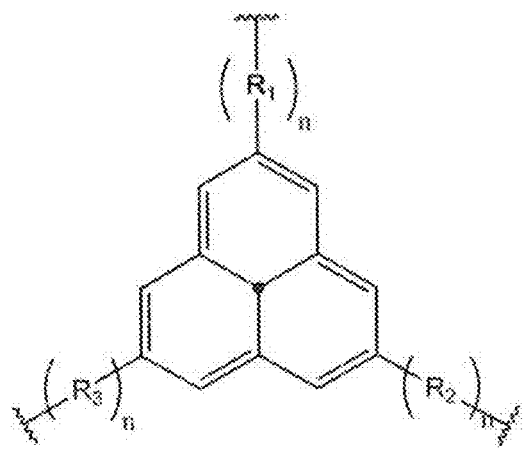

While high geometric symmetric and compactness are important features of many embodiments of the present invention, other embodiments which tailor the chemical nature of the linker groups are certainly possible as long as reasonable geometric and mechanical periodicity are maintained. FIGS. 13A and 13B shows some examples.

FIG. 13A shows a line-angle chemical formula of base structure of 2D polymer hybrid concept. $R_1$, $R_2$ and $R_3$ are each independent bridge units according to an embodiment of the present invention. FIG. 13B shows al line-angle chemical formula of an example of a multiple cyclic ring node according to an embodiment of the present invention. Nodes can be multiple aromatic rings, and are not limited to six-member carbon rings. $R_1$, $R_2$ and $R_3$ are each independent bridge units.

Example bridge units include, but are not limited to, the following linear polymers: polyethylene, p-phenylene terephthalamides, poly-metaphenylene isophthalamides, polyamidobenzimidazole, polybenzoxazole, polybenzothiazole, polybenzimidazole, polyhydroquinone-diimidazopyridine, cellulose, polyamide, polyester, polyimide, polyethylene terephthalate, polyethylene naphthalate, 4-hydroxybenzoic acid, 6-hydroxy-2-naphthoic acid, polyacetylene, polyacrylonitrile, and poly(i-lactid-co-caprolactone). The bridge units could also be constructed using only a sub-unit of a given polymer repeat unit. For example, and amide is a sub-unit of the full p-phenylene terephthalamides polymer. Bridge units could also be constructed by creating a co-polymer of linear polymers or their sub-units. For example, p-phenylene terephthalamides and polyamidobenzimidazole can be readily copolymerized to create a co-polymer bridge unit.

For example, combining PBO, PBT, and PBI-like linkers within the same 2D polymer unit cell would introduce some chemical variations, while maintaining geometric and mechanical periodicity.

Figure 4D:
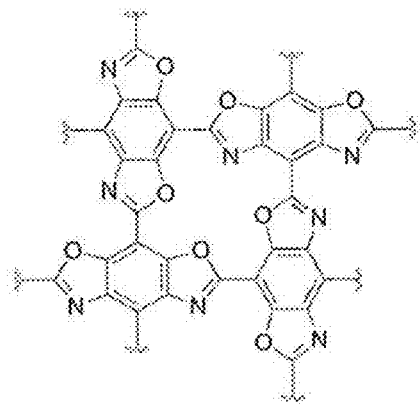

The nodes of the present invention have a stiff, ring-link structure amenable to hosting three or more linker groups. As shown in the examples of FIGS. 4A, 4D, and 7C, this node can consist of one or more aromatic 6-member or 5-member rings arranged into a compact grouping. FIG. 13B shows another general type of node. Within a given 2D polymer structure, it is possible to have multiple node characters (as in FIGS. 4A and 7C), as long as the structure remains geometrically and mechanically periodic and regular.

Synthesis of these 2D polymers can be accomplished via modification of conventional polymer synthesis routes. There are a number of chemistry polymerization techniques to make these materials. Herein, we detail methods to make polyamide, polyimide, polybenzimidazoles, polybenzoxazole, and polyesters, as examples, although other polymer chemistries that maintain $sp^2$ hybridization could also be utilized, such as polyimine.

Step-growth polymerization is used to prepare all of these polymers. In typical step-growth polymerization, two different monomers (of a generic backbone M) are mixed together, where one monomer contains two 'A' reactive groups (e.g., of the generic chemical formula A-M-A) and the other monomer contains two reactive 'B' groups (e.g., B-M-B) and the functional groups A and B are reactive with each other and not themselves. Thus, the reaction of the two monomers generally yields liked polymer, such as -[A-M-C-M-B]$_n$. where A and B react to form the molecular unit C. Alternatively, molecules with two different functional groups (e.g., A-M-B) can react/polymerize with each other to create a polymer, such as [A-M-C-M-B]$_n$. However, because it may be more difficult in some instances to prepare monomers with two different groups that are reactive towards each other, and especially so for 2D polymers, we generally limit this discussion to polymers prepared from two different monomers (exception 2D polyester from gallic acid).

To produce 2D polymers according to embodiments of the present invention using a step-growth approach, at least one monomer must have 3 or more functional groups per molecule to function as the node. The greater the functionality of each molecule, the greater the likelihood of greater crosslink density of the resulting polymer and smaller pores.

To maintain a 2D polymer that is planar in nature, the bonding is sp, $sp^2$, and/or $sp^3$, with the $sp^3$ bonding occurring in pairs to enable any out of plane bonding directionality of the polymer to be immediately counteracted by a bond direction in the equal and opposite direction.

There are three general approaches for the 2D polymerization. The first involves using an exact stoichiometric balance of the reactants to produce high molecular weight 2D polymers. Exact stoichiometric balance achieves high molecular weights. If lower molecular weights are tolerable, the stoichiometric balance could be less exact. The second approach involves the use of a stoichiometric excess of one component to allow 2D dendritic growth of the polymer. For each generation of growth, the polymer would have functionality of most recent the component added to it. If the resulting polymer is a solid, the solid could be easily filtered off and then excess of the other monomer could be added. Especially at low molecular weights, the resulting polymer is likely soluble in the reaction and thus would be more difficult to purify. Automated process similar to those used for solution layer deposition could be used to grow such a polymer. Nonetheless, on its own, this is a slow process. The third is a combination thereof whereby the polymerization at stoichiometric balance is allowed to continue for a duration, including to the duration upon which polymerization stops due to very slight stoichiometric imbalance. At which point an excess quantity of one component is added to functionalize the exterior growing polymer completely and then alternatively with the other monomer. This third process offers the benefits of faster growth without painstaking issues associated with ensuring exact stoichiometric balance.

There are various mass transfer means to cause the polymerization. The first is bulk polymerization of the components where the monomers are liquids and the resulting polymer is a liquid or even a solid during the course of the reaction. The second is solution polymerization. Here, the concentration of monomers is lower, which causes slower growth. On the other hand, the slower reaction and the interactions of the growing polymer with the solvent should allow access of monomer to ensure more complete reaction of the reactive sites and reduce the number of defect sites. Additionally, the solvent may help the polymer stay in solution longer as well as decrease the viscosity of the reaction mixture and therefore to enable attainment of higher molecular weights in the liquid phase. Neither of these methods reduces the degrees of freedom for the reaction to prevent out of plane reaction from occurring. The third method is interfacial polymerization. This can be done in emulsion form, but a lamellar 2 phase system is beneficial to producing larger size 2D polymers. The interfacial system ensures that reaction only occurs at the interface. If the system is highly quiescent, the range of reaction at the interface could be quite thin helping to force 2D polymer formation rather than out of plane reactions. Similarly, a gas-liquid phase polymerization can be forced through the use of a Langmuir-blodgett system. Another analogous methodology is heterogeneous catalysis of the polymerization at a solid interface.

Figure 14:
FIG. 14 depicts generalized preparation procedures for 2D polyamides according to embodiments of the present invention.
Figure 14:
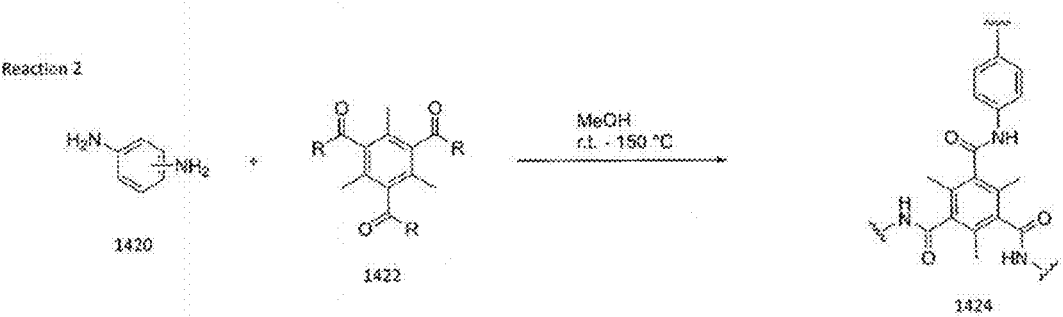
Figure 14:
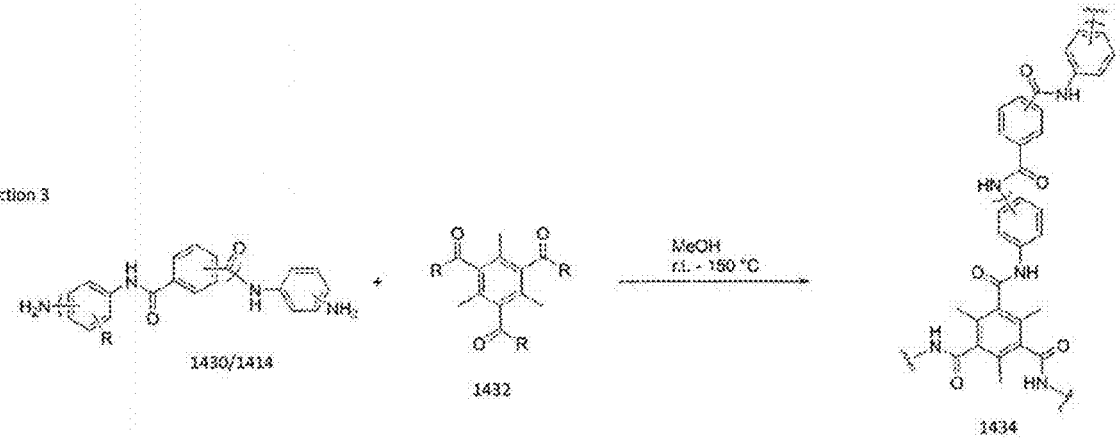

Polyamide polymers are prepared by reacting molecules carboxylic acids, acid chlorides, or esters with amines. FIGS. 3A and 3B shows the general structure of an aromatic polyamide. FIG. 14 depicts general preparation procedures for 2D polyamides. Reaction 1 details the methodology to produce linear polyamide chain extenders (1414) using diamines (m=2), such as p-phenylenediamine where R=H (1410), and dicarboxylic acids or their acid chlorides (m=2), such as terephthalic acid where R=OH (1412). Reaction 2 shows a methodology to make 2D polymers (1424) using use monomers with more than 2 functional group per node, such as for 1,3,5-tricarboxylic acid-2,4,6-trimethylbenzene where R=OH (1422) with m=3, reacted with diamines, such as p-phenylenediamine (1420). Reaction 3 takes the linear polymer 1430 produced from reaction 1 (1414) and reacts it with an m>2 carboxylic acid, specifically 1,3,5-tricarboxylic acid-2,4,6-trimethylbenzene where R=OH (1432) to form 2D polymer (1434).

To produce the 2D Kevlar or graphamid that is analogous to graphene would require the use of hexaaminobenzene and mellitic acid (benzene hexacarboxylic acid). To form similar 2D aromatic polyamides with lower degree of crosslinking, the following three types of monomers would be used: 1) a mixture of diamines and n-functional dicarboxylic acids/chlorides/esters with n≥3, 2) a mixture of dicarboxylic acids/chlorides/ester and n-functional diamines with n≥3, and 3) A mixture of n-functional dicarboxylic acids/chlorides/esters with n≥3 and n-functional diamines with n≥3. The core molecules represent structures onto which these amine and carboxylic functionality could be attached but are not limited to the following: benzene, triphenylene, trinapthylene, tetraphenylethylene, trisphenylbenzene, naphthalene.

Particular useful amine structures include the following structures that would result in all $sp^2$ bonds through the backbone chains of the 2D polymer: 2,3,6,7- and other tetraaminonapthylene, 2,6-diaminonapthylene, melamine (Sigma-Aldrich, et al.), p-phenylenediamine (Sigma-Aldrich, et al.), m-phenylenediamine (Sigma-Aldrich, et al.), 1,3,5-triaminobenzene, 1,2,4,5-tetraaminobenzene, triamterene (Sigma-Aldrich, et al.), triamino-triphenylene, hexaaminotriphenylene, triamino-trinapthylene, tetraamino-trinapthylene, tetraamino-tetraphenyleneethylene, hexaamino-trinapthylene, tetraamino-tetraphenylethylene, octaamino-tetraphenylethylene, 1,3,5-tris(4-aminophenyl) benzene, triamino-trisphenylbenzene. For the compounds not available from Sigma-Aldrich and other common suppliers, their non-amino base chemicals are all available through Sigma-Aldrich and other common suppliers and amine variants of these chemicals can be prepared by simple nitration followed by reduction to the amine or other known techniques to produce amines.

Particular useful carboxylic acid structures, including the acid chloride and methyl and alkyl esters thereof, that would result in all $sp^2$ bonds through the backbone chains of the 2D polymer are: oxalic acid (Sigma-Aldrich, et al.), terephthalic acid (Sigma-Aldrich, et al.), phthalic acid (Sigma-Aldrich, et al.), mellitic acid (Sigma-Aldrich, et al.), furandicarboxylic acid (Sigma-Aldrich, et al.), 2,3,6,7- and other napthylenetetracarboxylic acid, 1,6-napthylenedicarboxylic acid, 1,3,5-benzene-tricarboxylic acid (trimesic acid) (Sigma-Aldrich, et al.), 1,2,4,5-benzenetetracarboxylic acid benzenetetracarboxylic acid, triphenylene-tricarboxylic acid, triphenylene-hexcarboxylic acid, trinapthylene-tricarboxylic acid, trinapthylene-hexcarboxylic acid, tetracarboxylic acid-phenyleneethylene, octacarboxylic acid-tetraphenyleneethylene, hexacarboxylic acid-trisphenylbenzene. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives. FIGS. 9A-B show representative structures of a hybrid aliphatic aromatic amine. Although it may be difficult to maintain planarity in this structure because of the $sp^3$ aliphatic bonds, it may be possible in techniques that limit the degrees of freedom of the monomers, such as interfacial polymerization, Langmuir Blodgett polymerization methods, and substrate-liquid heterogeneous polymerization. In all cases, the aliphatic polyamide linkages must be even in number. This molecule is prepared in much the same way the aromatic polyamide is formed except that some amount aliphatic carboxylic acid and amines are required in addition. As illustrated, polyaminobenzene species is reacted with an aliphatic carboxylic acid. The stoichiometry would decide the number of aliphatic repeat units, and thus the aromatic amine. Conversely, an aromatic polycarboxylic acid could be used as the 2D branching core. In all, the amines and carboxylic acids are used in stoichiometric quantities to produce a 2D polymer.

Any of the aromatic amines and carboxylic acids as previously detailed could be used. The aliphatic diamines include but are not limited to ethylenediamine (Sigma-Aldrich, et al.), putrescine (Sigma-Aldrich, et al.), hexamethylenediamine (Sigma-Aldrich, et al.), 1,8-diaminooctane (Sigma-Aldrich, et al.). The carboxylic acids include but are not limited to oxalic acid (Sigma-Aldrich, et al.), succinic acid (Sigma-Aldrich, et al.), adipic acid (Sigma-Aldrich, et al.), suberic acid (Sigma-Aldrich, et al.), and sebacic acid (Sigma-Aldrich, et al.). Additional aliphatic/aromatic monomers could be used including diaminofuran and difuryldiamine. An alternative chemical technique to prepare polyamides is from carboxylic anhydrides.

Figure 19:
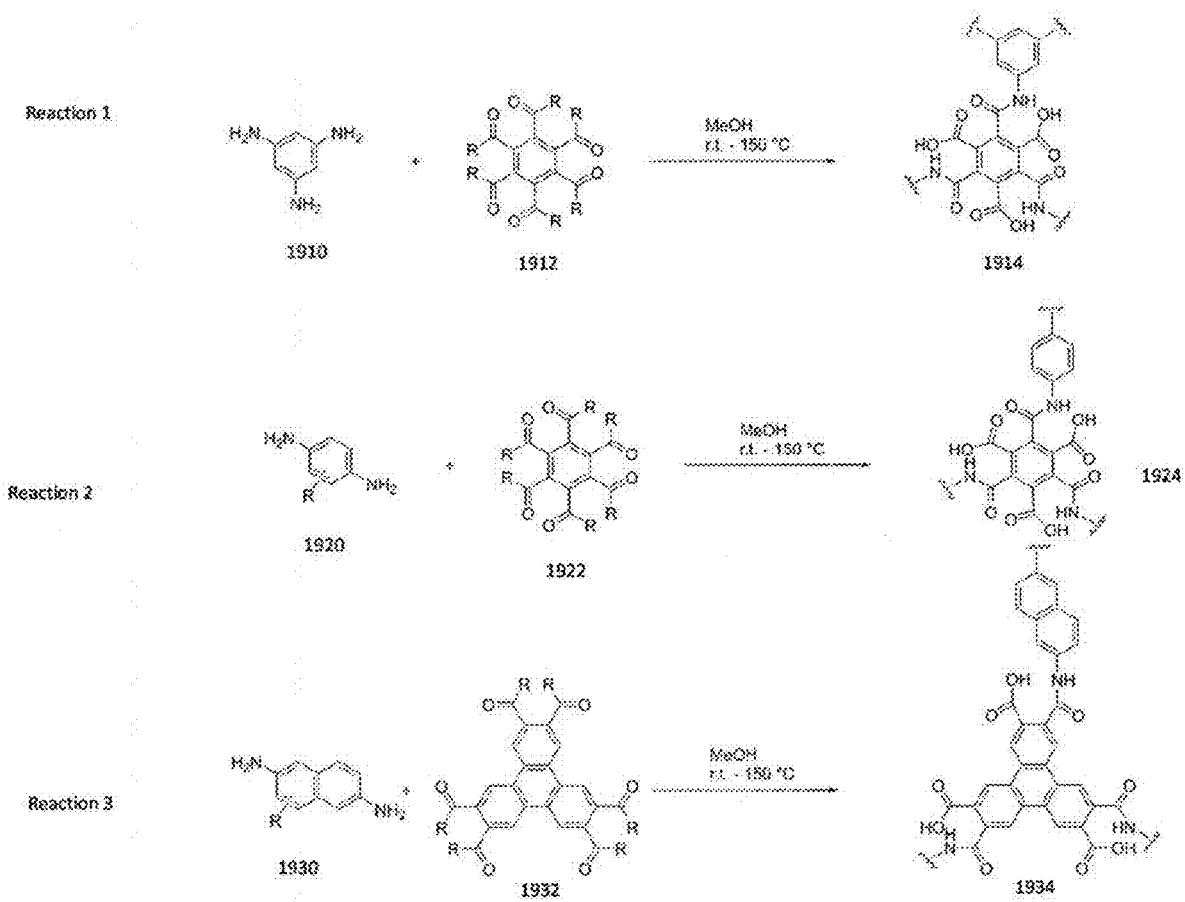
FIG. 19 depicts generalized synthesis procedures to prepare 2D polyamic acids according to embodiments of the present invention.

FIG. 19 shows generalized synthesis procedures to prepare 2D polyamic acids. Reaction 1 involves reaction of an m>2 amine, such as 1,3,5-triaminobenzene (1910), and an m>2 carboxylic ester, such as mellitic acid ester where every other R is a —OH or —OMe (1912), to yield the 2D polymer structure (1914). In reaction 2 a diamine, such as p-phenylenediamine where R=H (1920) reacts with an m>2 carboxylic ester, such as mellitic acid ester where every other R is a —OH or —OMe (1922), to yield the 2D polymer structure (1924). In reaction 3 a diamine, such as 2,6-diaminonapthylene where R=H (1930) reacts with an m>2 carboxylic ester, such as mellitic acid ester where every other R is a —OH or —OMe (1922), to yield the 2D polymer structure (1934).

Derivatives of phenotetracarboxylic dianhydride and/or phenohexacarboxylic trianhydride and/or the corresponding dimethyl and trimethyl esters of benzophenotetracarboxylic dianhydride (Sigma-Aldrich, et al.) and/or benzophenohexacarboxylic trianhydride, respectively, are the starting reactants in all of these general synthetic techniques. Solvents such as methanol, acetone, ethanol, etc. are generally required to maintain the carboxylic reactants and products in the liquid phase. Methanol reacts with the carboxylic anhydride groups to produce in situ generated dimethyl and trimethyl ester derivatives of benzophenotetracarboxylic dianhydride and/or benzophenohexacarboxylic trianhydride, respectively. Either pre-distilled or untreated aromatic diamines are then reacted with the ester groups to produce a C—N linkage and methanol leaving group. This reaction is run at or near room temperature (23° C. to 150° C.) under ambient atmosphere. A diamine with one amine protected while the other is free to react with the carboxylic reactants could also be used. Reaction conditions will be at or near room temperature under ambient atmosphere. Removal of the protecting group will vary depending on the protecting group used, but this reaction will not be run until the purity of the product can be assured to prevent. The excess solvent and any residual volatiles will be removed from the wanted product under reduced pressure or using vacuum distillation. Typical separation techniques will be used, including solvent extractions using methylene chloride or ethyl ether and/or column chromatography. The amine chemicals previously described for polyamide synthesis are all applicable. The anhydrides that could be used include, but are not limited to the following: phenotetracarboxylic dianhydrides, including benzophenonetetracarboxylic dianhydride and their dimethyl esters, phenohexacarboxylic trianhydrides (including triphenylenehexacarboxlic acid trianhydride) and their trimethyl esters, dianhydrides of tetraphenyleneethylene and tetramethyl esters of such. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives.

Figure 12C:
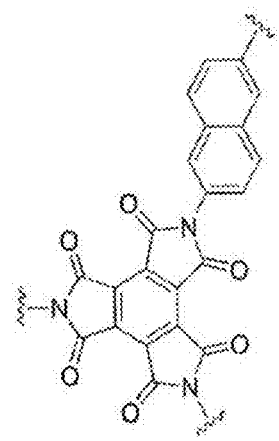

FIGS. 12A, 12B and 12C shows representative examples structures of polyimides derived from anhydride-derived polyamides. Effectively, any products from FIGS. 11A-11C can be imidized (cyclization of the amide and carboxylic acid next to it) at elevated temperature producing water. Evaporation of the water at elevated temperatures during the reaction helps drive the reaction progress. Derivatives of phenotetracarboxylic dianhydride and/or phenohexacarboxylic trianhydride and/or the corresponding dimethyl and trimethyl esters of benzophenotetracarboxylic dianhydride and/or benzophenohexacarboxylic trianhydride, respectively, are one of the starting reactants in all of these general synthetic techniques. Solvents such as methanol, acetone, ethanol, etc. will likely be required to maintain the carboxylic reactants and products in the liquid phase. Methanol will react with the carboxylic anhydride groups to produce in situ generated dimethyl and trimethyl ester derivatives of benzophenotetracarboxylic dianhydride and/or benzophenohexacarboxylic trianhydride, respectively. Either pre-distilled or untreated aromatic diamines will then reacted with the ester groups to produce a C—N linkage and methanol leaving group. Further heating of the reaction mixture will result in a dehydration of in situ formed amide polymer and proceed to the formation of imide polymer. This reaction should run at or near room temperature (23° C. to 150° C.) under ambient atmosphere. A diamine with one amine protected while the other is free to react with the carboxylic reactants could also be used. Reaction conditions will be at or near room temperature under ambient atmosphere. Removal of the protecting group will vary depending on the protecting group used, but this reaction will not be run until the purity of the product can be assured to prevent. Similarly, the desired imide polymers could be also generated upon the heating of isolated amide polymers either in a solution or in an air-circulating oven at 200° C. for 2-16 h followed by 230° C. for 0.5-16 h. The excess solvent and any residual volatiles will be removed from the desired product under reduced pressure or using vacuum distillation. Typical separation techniques will be used, including precipitation, solvent extractions using methylene chloride or ethyl ether and/or column chromatography. The particular monomers to be used include all of the amines described in the polyamide section and carboxylic acid derivatives described in the anhydride polyamide procedure.

Polybenzimidazoles (PBI) are produced by the reaction of diprotected tetrafunctional amines with dicarboxylic acids (FIGS. 5B, 6, 16, 17).

Stoichiometric quantities of 1,3-diamino-4,6-(p-toluenesulfamido)benzene with terephthalic acid are slowly heated to 95° C., whereupon the ditosylate was hydrolyzed to the free amine. Heating the reaction mixture to 195° C. for 6 hr produced very high molecular weight PBI. The production of tosylates of amines is well known. Similar reactions with acid chlorides are well known and reported in the literature, and thus their methodology would also be applicable to producing 2D PBIs. FIGS. 5B and 6 show a representative structure of such PBIs. Note because two amines are used in every stop growth reaction with the carboxylic acid, the amine functionality (including protected amines and functional groups that can easily be converted to amines) must be a minimum of 4. The carboxylic acid functionality must be a minimum of 2.

Particular useful amine structures include, 2,3,6,7- and other tetraaminonapthylene, 2,6-diaminonapthylene, melamine (Sigma Aldrich, et al.), p-phenylenediamine (Sigma Aldrich, et al.), m-phenylenediamine (Sigma Aldrich, et al.), 1,3,5-triaminobenzene, 1,2,4,5-tetraaminobenzene, triamterene (Sigma Aldrich, et al.), triaminotriphenylene, hexaaminotriphenylene, triamino-trinapthylene, tetraamino-trinapthylene, tetraamino-tetraphenyleneethylene, hexaamino-trinapthylene, tetraamino-tetraphenylethylene, octaamino-tetraphenylethylene, 1,3,5-tris(4-aminophenyl)benzene, triamino-trisphenylbenzene. For the compounds not available from Sigma-Aldrich and other common suppliers, their non-amino base chemicals are all available through Sigma-Aldrich and other common suppliers and amine variants of these chemicals can be prepared by simple nitration followed by reduction to the amine or other known techniques to produce amines.

Particular useful carboxylic acid structures including the acid chloride and methyl and alkyl esters thereof: terephthalic acid (Sigma Aldrich, et al.), phthalic acid (Sigma Aldrich, et al.), mellitic acid (Sigma Aldrich, et al.), furandicarboxylic acid (Sigma Aldrich, et al.), 2,3,6,7- and other napthylenetetracarboxylic acid, 1,6-napthylenedicarboxylic acid, 1,3,5-benzene-tricarboxylic acid (Sigma Aldrich, et al.), 1,2,4,5-benzenetetracarboxylic acid, triphenylene-tricarboxylic acid, triphenylene-hexcarboxylic acid, trinapthylene-tricarboxylic acid, trinapthylene-hexcarboxylic acid, tetracarboxylic acid-phenyleneethylene, octacarboxylic acid-tetraphenyleneethylene, hexacarboxylic acid-trisphenylbenzene. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives.

The 2D polymer analog of M5 fiber is a type of PBI where the dicarboxylic acid used is 2,5-dihydoxyterephthalic acid.

Figure 15:
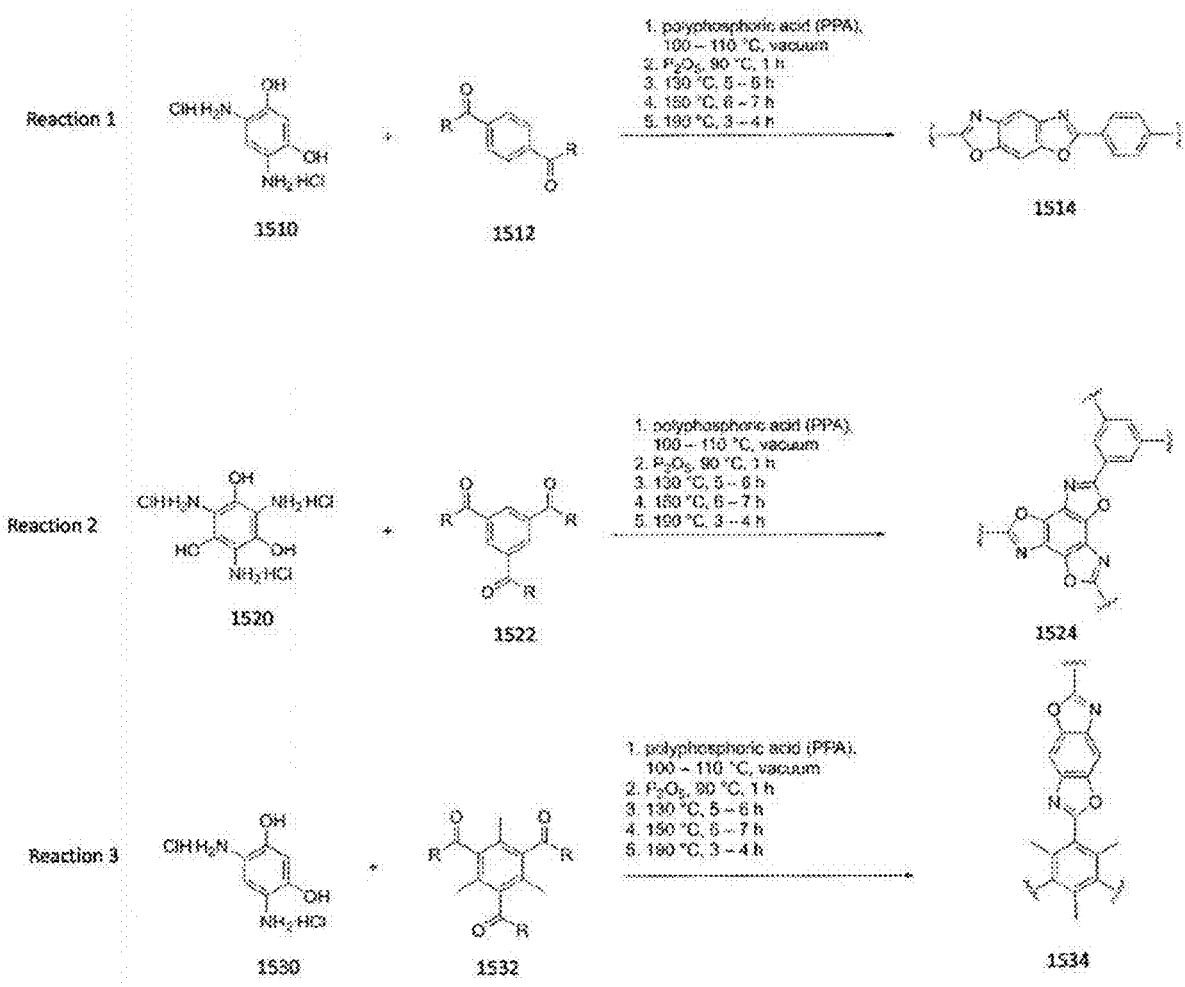
FIG. 15 depicts generalized synthesis procedures to prepare 2D polybenzoxazoles according to embodiments of the present invention.

FIG. 15 depicts generalized synthesis procedures to prepare 2D polybenzoxazoles, such as those shown in FIGS. 4A-4D. In Reaction 1, a diamino, dihydroxy monomer (m=2), such as 1,4-diamino-2,5-dihydoxylbenzene 2HCl (1510) is reacted with a diacid/diester/diacid chloride (m=2), such as terephthalic acid where R=OH (1512) where m=2 to produce a linear chain extender (1514). In Reaction 2, an m>2 amino, hydroxy monomer, such as 1,3,5-triamino-2,4,6-trihydoxylbenzene (1520) (m=3), is reacted with an m>2 carboxylic acid/ester/acid chloride, such as 1,3,5-benzenetricarboxylic acid where R=OH (1522) (m=3), to produce a 2D polymer (1524). In Reaction 3, a diamino, dihydroxy monomer (m=2), such as 1,4-diamino-2,5-dihydoxylbenzene 2HCl (1530), is reacted with an m>2 carboxylic acid/ester/acid chloride such as, 1,3,5-tricarboxylic acid-2,4,6-trimethylbenzene where R=OH (1532) (m=3), to produce a 2D polymer (1534).

Generally, polybenzoxazoles (PBO) are produced by the reaction of monomers containing an aromatic species with two amines and two hydroxyl groups and the amines and hydroxyl groups are ortho to each other. Analogously to the above described generation of polyamides, upon the initial exposure terephthaloyl chloride or other acid chlorides or carboxylic acids to diaminodihydroxy functionalized benzene or another aromatic core, the amine groups displace the chlorine atoms and form the corresponding polyamides. The consequent heating of the reaction mixture to high temperatures (250-300° C.) completes the cyclization to produces the desired PBO product. Alternatively, PBO compounds can also be obtained upon a thermal treatment (400° C.) of aromatic polyimides containing hydroxy functional groups ortho-appended to the imide groups. Similar procedures with acid chlorides are previously reported in the literature, and therefore their methodology would also be utilized in the generation of 2D PBOs.

Particular useful amine/hydroxyl structures include, 1,6-diamino-2,7-dihydoxylnapthylene, 1,4-diamino-2,5-dihydoxylbenzene, and tri(1-amino-2 hydroxyl)-triphenylene and amine/hydroxyl derivatives of previously listed amines. For the compounds not available from Sigma-Aldrich and other common suppliers, their hydroxyl functional non-amino base chemicals are all available through Sigma-Aldrich and other common suppliers and amine variants of these chemicals can be prepared by simple nitration followed by reduction to the amine or other known techniques to produce amines. Similarly thiazoles can be produced using a similar chemistry where the starting monomer has thiol (—SH) functional groups instead of hydroxyl groups (FIG. 5A).

Particular useful carboxylic acid structures including the acid chloride and methyl and alkyl esters thereof: oxalic acid (Sigma-Aldrich, et al.), terephthalic acid (Sigma-Aldrich, et al.), phthalic acid (Sigma-Aldrich, et al.), mellitic acid (Sigma-Aldrich, et al.), furandicarboxylic acid (Sigma-Aldrich, et al.), 1,2,6,7-napthylenetetracarboxylic acid, 1,3,5,7-napthylenetetracarboxylic acid, and 1,3,6,8-napthylenetetracarboxylic acid, 1,6-napthylenedicarboxylic acid, 1,3,5-benzene-tricarboxylic acid, 1,2,4,5-benzenetetracarboxylic acid, triphenylene-tricarboxylic acid, triphenylene-hexcarboxylic acid, trinapthylene-tricarboxylic acid, trinapthylene-hexcarboxylic acid, tetracarboxylic acid-phenyleneethylene, octacarboxylic acid-tetraphenyleneethylene. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives.

Figure 16:
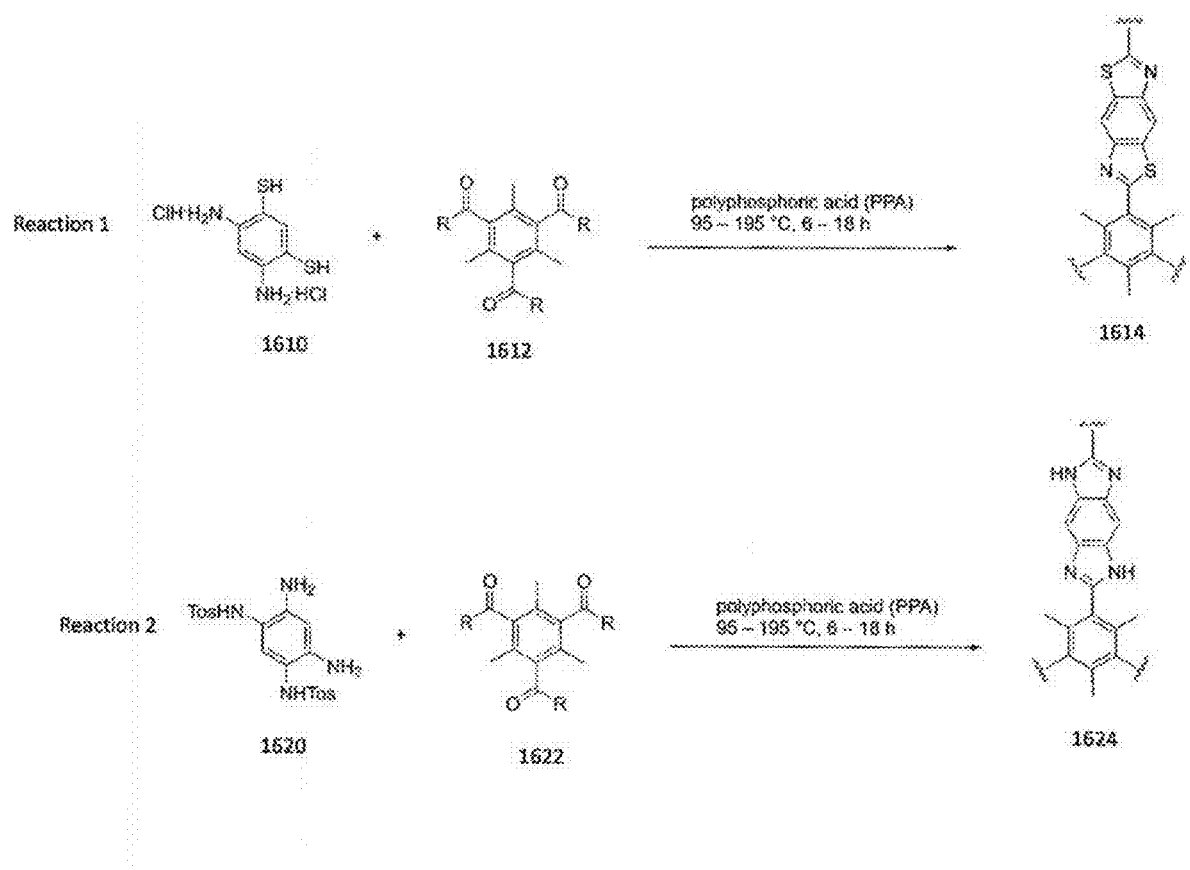
FIG. 16 depicts generalized synthesis procedures to prepare 2D polybenzothiazoles and polybenzimidizoles according to embodiments of the present invention.

FIG. 16 depicts generalized synthesis procedures to prepare 2D polybenzothiazoles and polybenzimidizoles. In Reaction 1, a diamino, dithiol aromatic compound (m=2), such as 1,4-diamino-2,5-dithiobenzene 2HCl (1610) is reacted with an m>2 carboxylic acid/acid chloride, such as 1,3,5-tricarboxylic acid-2,4,6-trimethylbenzene where R=OH (1612) (m=3), to produce a 2D polymer (1614). In Reaction 2, diprotected tetraamine, such as ditosylated 1,2,4,5-tetraaminobenzene (1620) (m=2) is reacted with an m>2 carboxylic acid/ester/acid chloride, such as 1,3,5-tricarboxylic acid-2,4,6-trimethylbenzene where R=OH (1622) (m=3), to form the 2D polymer (1624).

Figure 17:
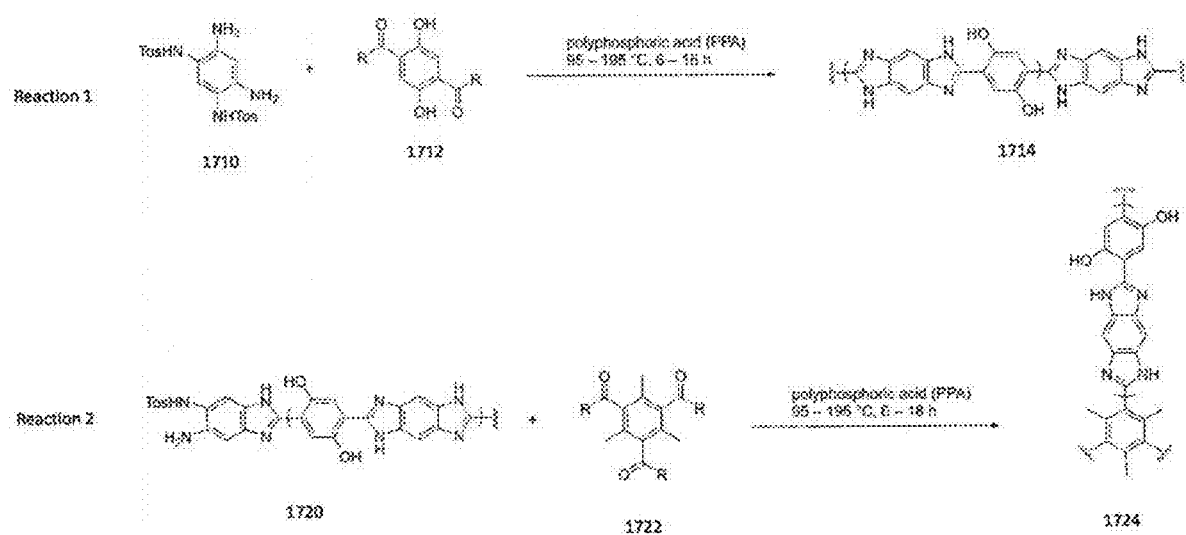
FIG. 17 depicts generalized synthesis procedures to prepare 2D polyhydroquinone-diimidazopyridine according to embodiments of the present invention.

FIG. 17 depicts generalized synthesis procedures to prepare 2D polyhydroquinone-diimidazopyridine. In Reaction 1, a diprotected tetraamine (m=2), such as ditosylated 1,2,4,5-tetraaminobenzene (1710) is reacted with a di-carboxylic acid/acid chloride (m=2), such as 2,5-diolterephthalic acid where R=OH (1712) to produce the linear chain extender segment (1714). In Reaction 2, the linear chain extender (1714/1720) is reacted with an m>2 carboxylic acid/acid chloride, such as 1,3,5-tricarboxylic acid-2,4,6-trimethylbenzene where R=OH (1722) (m=3), to form the 2D polymer (1724).

Figure 18:
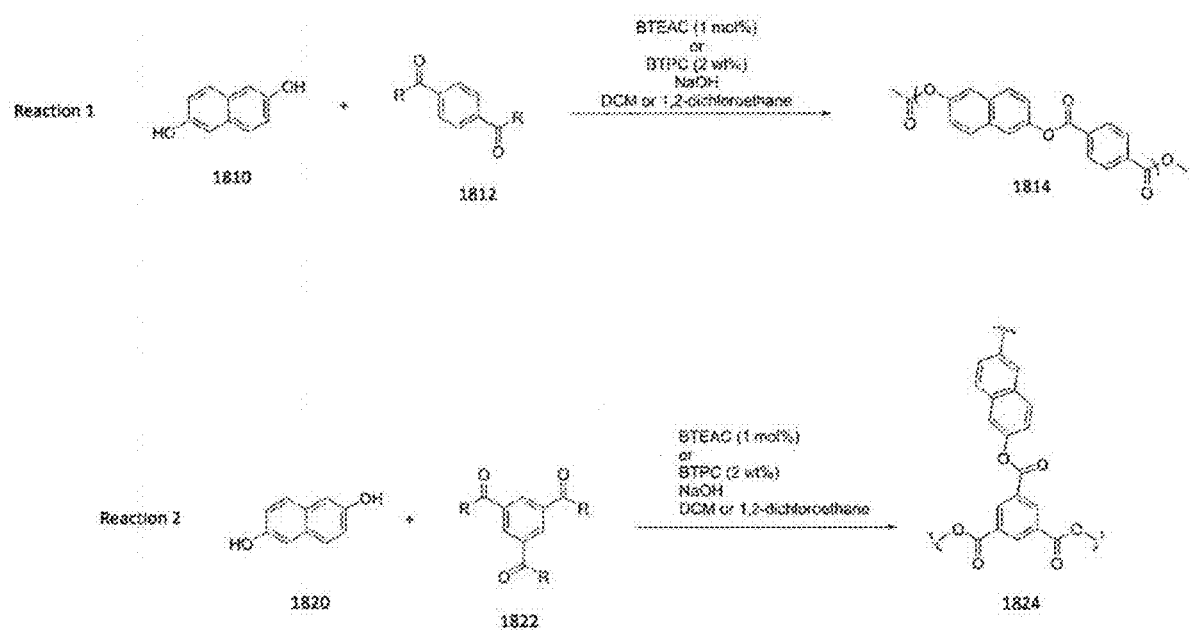
FIG. 18 depicts generalized synthesis procedures to prepare 2D polyesters according to embodiments of the present invention.

FIG. 18 depicts generalized synthesis procedures to prepare 2D polyesters. They generally involve the reaction between alcohols and carboxylic acids/acid chlorides (FIG. 18). Reaction 1 involves reaction of a diol (m=2), such as 2,6-napthylene diol (1810), with a dicarboxylic acid or its acid chlorides (m=2), such as terephthalic acid chloride where R=Cl (1812) to produce linear polyester chain extender (1814). Reaction 2 involves reaction of a diol (m=2), such as 2,6-napthylene diol (1820), with an m>2 arboxylic acid or its acid chloride, such as 1,3,5-benzenetricarboxylic acid chloride where R=Cl (1822) (m=3), to produce a 2D polymer (1824).

In general, aromatic alcohols are not reactive with carboxylic acids because of the low acidity of the aromatic hydroxyl groups. Thus, acid chlorides are used for reaction with aromatic alcohols to form polyesters. Typical reaction conditions are: To a 3-necked round bottom flask equipped with a mechanical stirrer was added the hydroxyl containing monomer (1 equivalent), BTEAC (1 mol %) or BTPC (benzyltriphenylphosphonium chloride, 2 wt % with respect to the expected molecular weight of the polymer), and 1 M aqueous NaOH solution (21.03 mL). This mixture was stirred to effect dissolution of phenolate into the aqueous media. To a constant pressure dropping funnel was added DCM or 1,2-dichloroethane (52.6 mL) and acid chloride (1 equivalent). This mixture of acid chloride was added dropwise over 20 minutes to the aqueous solution along with very vigorous mixing. Upon complete addition of the acid chloride, the biphasic reaction mixture was vigorously mixed for 3 hours at room temperature. The biphasic mixture was allowed to settle and the contents were poured directly into an Ehrlenmeyer flask containing an equal volume of ethanol or methanol. The polymer precipitate can be recovered and used after water washes to remove salts.

Polyester are produced in the polymerization of carboxylic acids and alcohols. Typical solution reaction conditions for carboxylic acids and alcohols are: 1 equivalent of the hydroxyl containing monomer and 1 equivalent of carboxylic acid monomer were suspended in xylenes and dissolved at 55° C. before adding p-toluenesulfonic acid (5.0 wt %) and refluxed with aid of a Dean-Stark attachment. The progress of the reaction was monitored by Acid Number (AN) titration, and once the desired AN had been reached, the reaction was fitted with a vacuum distillation adapter and distilled at ambient pressure for 2 h and then under reduced pressure (−680 mbar) for 0.5 h. solvent was evaporated through use of vacuum oven at 55° C. at −30 mbar for 18 h.

Typical bulk reaction conditions are similar to that of the carboxylic acid-alcohol solution method except the temperature utilized is much higher, typically at 150° C. As such, the use of a catalysis, such as p-toluene sulfonic acid, can be highly reduced or eliminated. The monomers used for this reaction mirror those previously discussed to produce 2D polyesters (FIGS. 7-8). The carboxylic acid monomers and their acid chloride derivatives would include: oxalic acid (Sigma-Aldrich, et al.), terephthalic acid (Sigma-Aldrich, et al.), phthalic acid (Sigma-Aldrich, et al.), mellitic acid (Sigma-Aldrich, et al.), furandicarboxylic acid (Sigma-Aldrich, et al.), 1,2,6,7-napthylenetetracarboxylic acid, 1,3,5,7-napthylenetetracarboxylic acid, and 1,3,6,8-napthylenetetracarboxylic acid, 1,6-napthylenedicarboxylic acid, 1,3,5-benzene-tricarboxylic acid, 1,2,4,5-benzenetetracarboxylic acid, triphenylene-tricarboxylic acid, triphenylene-hexcarboxylic acid, trinapthylene-tricarboxylic acid, trinapthylene-hexacarboxylic acid, tetracarboxylic acid-phenyleneethylene, octacarboxylic acid-tetraphenyleneethylene. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives.

If aliphatic/aromatic polyesters are prepared, again, aliphatic monomers with an even number of carbon atoms are required. The carboxylic acids include but are not limited to oxalic acid (Sigma-Aldrich, et al.), succinic acid (Sigma-Aldrich, et al.), adipic acid (Sigma-Aldrich, et al.), suberic acid (Sigma-Aldrich, et al.), and sebacic acid (Sigma-Aldrich, et al.). The alcohols that could be used would include the following aromatic alcohols: 2,3,6,7-napthylene-tetraol, 1,3,5,7-napthylene-tetraol, and 1,3,6,8- and other napthylene-tetraol, 1,6-napthylene-diol, p-phenylenediol (Sigma-Aldrich, et al.), m-phenylenediol (Sigma-Aldrich, et al.), 1,3,5-benzene-triol (Phloroglucinol) (Sigma-Aldrich, et al.), 1,2,4,5-benzene-tertraol, triphenylene-triol, triphenylene-tetraol, trinapthylene-triol, trinapthylene-tetraol, trisphenylbenzene-triol. For the compounds not available from Sigma-Aldrich and other common suppliers, their non-carboxylic acid base chemicals are all available through Sigma-Aldrich and other common suppliers or methyl ester of such molecules are available. Known methods exist to add carboxylic acid functionality to the base molecules to produce the desired carboxylic acid variants. From ester functional molecules, the carboxylic acid derivatives can then be prepared by esterification with water. Aldehyde functional molecules can be oxidized using known procedures to form carboxylic acid derivatives. Interestingly, there exists a bio-derived monomer called gallic acid that is an A-B polyester monomer. The monomer contains both carboxylic acid (1 per molecule) and hydroxyl (3 per molecule) functionality. To polymerize this, the acid chloride would need to be prepared using oxalyl chloride and polymer synthesis would begin during acid chloride preparation or upon a subsequent treatment of the resulting compound with sodium hydroxide and BTPC or BTEAC.

Plasmas of ethyl benzene (Sigma Aldrich et al.) and ethylene (Sigma Aldrich et al.) are used to be able to form graphylene structures (FIG. 2) using. The plasma energy needs to be low to prevent breaking apart these molecules in the plasma phase. Use of remote plasma, where the plasma is generated separately and allowed to interact slightly with the gaseous organics is advantageous.

To prepare graphylene and similar analogs, crystalline solids of $C_6(CH_3)_6$ hexamethylbenzene (Sigma Aldrich et al.), Durene, $C_6H_2(CH_3)_4$ (Sigma Aldrich et al.), or Mesitylene $C_6H_3(CH_3)_3$ (Sigma Aldrich et al.) will be used to create a molecular symmetry and coordination. A particular plane of the crystal could be used that correspond to where the aromatic rings all laid down on the surface plane. Crystal symmetry thus enforces a template for polymerization. Energetic surface processes such as plasma and/or heating, and laser exposure can be used to energetically form radicals, abstract a hydrogen from the methyl groups, to create a chemical potential for reaction between the molecules. Hydrogen gas would be generated and the crystal structure changes during the reaction causing an epitaxial stress that self-exfoliates the 2D polymers over time. Thus, application of pressure to the crystal is useful to maintain crystalline structure and 2D bonding. If not, dissolution of lower layers of chemical can be done in toluene leaving behind the remaining 2D polymer.

Similar concepts can be applied to make different chemistry 2D polymers, including using phenyl functional monomers. To make 2D polyamides and 2D polyesters, A-M-B monomers would be required with the same number of A and B groups and having at least two of each per molecule. Amine and carboxylic acid/ester/anhydride functional groups on a single molecule or carboxylic acid/ester/anhydride and alcohol functional groups on a single molecule. Such amine/carboxylic monomers include 1,4-diamino-2,5-dicarboxylic acid benzene and such carboxylic acid/alcohol monomers include 1,4-dicarboxylic-2,5-dihydroxybenzene. The crystalline solids are exposed to an energetic source to prepare the 2D polymers where again pressure would be useful to maintain the crystal structure during exposure to the energetic field.

In addition to the aforementioned ballistic applications, we can envision a wide range of applications for these materials. These 2D polymers could be used for structural application, for bearing mechanical load in vehicle structures, buildings, sporting goods, and military platforms. These 2D polymers could be produced as finite-sized platelets (e.g. 1-1000 nm thick with diameters of e.g. 0.1-100 microns) that are used as an additive, filler, modifier, or reinforcement for polymer, metal, or ceramic matrices. In particular, the ability to tailor the composition of these 2D polymers to make them more chemically interactive with a matrix material and increase internal layer-to-layer bonding makes them very attractive as nanocomposite reinforcement; in contrast, graphene is very inert and therefore poorly bonds to polymer matrices and exhibits weak inter-layer strength, so that single-layer and multi-layer graphene reinforced polymers have not provided dramatic improvements in performance relative to unreinforced polymer. Applications for these reinforced polymers could include feedstock into additive manufacturing (so-called "3D printing") technologies.

The 2D polymers described in this disclosure also have great potential as selective barriers for selective filtration, such as for reverse osmosis purification of water; and for energy storage devices such as batteries, supercapacitors, and fuel cells. In all these applications the ability to create a tailored pore size and pore chemistry can result in very high selectivity; and the high mechanical stiffness and strength of the membranes can allow high backpressure over thin membranes, resulting in very high flow and filtration rates through the membranes. These 2D polymers could also serve as packaging materials, for example to prevent moisture and oxygen from interacting with packaged food, electronics, or materials.

These 2D polymers could also prove useful in electronic materials. Tailoring the length and chemistry of the polymer bridge units allows one to create insulating, conducting, and semi-conducting polymers with applications to a wide variety of application including conductive ground planes, integrated circuits, high performance dielectric capacitors, and conductive filler.

EXAMPLES

Example 1

Polyamide polymer is prepared by charging p-phenylenediamine (2-5 g, 1 eq.), 5 wt % tetrabutylammonium bromide (TBAB) catalyst, and 0.15-0.20 M NaOH solution (15-20 mL) to a flask and stirred at RT under nitrogen until all components are completely dissolved. A stoichiometric amount of triphenylene-tricarboxylic acid chloride monomer is dissolved in chloroform (15-20 mL) and added in aliquots to the stirring diamine solution. Evolution of HCl gas formed upon addition and continued until several minutes after all acid chloride solution was added. The reaction was allowed to stir for 2 at room temperature. Alternatively, if carboxylic acids or esters are used instead of acid chlorides, a reaction temperature of 120° C. would be required to complete this reaction. In this case, a higher boiling solvent, such as 2-heptanone, would be needed. Yet interfacial polymerization would be less likely to be necessary as the amines and acids/esters would be more soluble at elevated temperatures, depending on the monomer chemical structure.

Example 2

Benzophenotetracarboxylic dianhydride was reacted with an excess of methanol at 55° C. for 4 hours while stirring. Triamino-triphenylene was added to the reaction and allowed to amidize at 50° C. for 1 day.

Example 3

Imide polymers were generated upon the heating of isolated amide polymers in an air-circulating oven at 200° C. for 2-16 h followed by 230° C. for 0.5-16 h. The excess solvent and any residual volatiles are be removed from the desired product under reduced pressure or using vacuum distillation.

Example 4

Polybenzimidazoles (PBI) are produced by addition of Stoichiometric quantities of 1,3-diamino-4,6-(p-toluenesulfamido)benzene (3 eq.) with mellitic acid (1 eq). This mixture is slowly heated to 95° C., whereupon the ditosylate is hydrolyzed to the free amine. Heating the reaction mixture to 195° C. for 6 hr produced very high molecular weight PBI.

Example 5

2D polybenzoxazoles are prepared using 1,6-diamino-2,7-dihydoxylnapthylene (2 eq.) and tetracarboxylic acid-phenyleneethylene (1 eq.). The carboxylic acids were converted to chlorides using known procedures using thionyl chloride as the reagent to produce polyamides. The reaction mixture was brought to high temperatures (250° C.) for 4 hours to enable the cyclization reaction to produce the desired PBO product.

Example 6

To a 3-necked round bottom flask equipped with a mechanical stirrer was added the hydroxyl containing monomer, hydroquinone (3 equivalents), BTEAC (1 mol %) or BTPC (benzyltriphenylphosphonium chloride, 2 wt %, and 1 M aqueous NaOH solution (21 mL). This mixture was stirred to effect dissolution of phenolate into the aqueous media. To a constant pressure dropping funnel was added DCM or 1,2-dichloroethane (52.6 mL) and 1,3,5-benzenetricarboxylic acid chloride (2 equivalents). This mixture of acid chloride was added dropwise over 20 minutes to the aqueous solution along with very vigorous mixing. Upon complete addition of the acid chloride, the biphasic reaction mixture was vigorously mixed for 3 hours at room temperature. The biphasic mixture was allowed to settle and the contents were poured directly into an Ehrlenmeyer flask containing an equal volume of ethanol or methanol to remove any residual monomer. The polymer precipitate is water washed to remove salts with evaporation of solvent at 50° C. under vacuum.

Example 7

Mesitylene $C_6H_3(CH_3)_3$ is cooled to −50° C. to turn it into a crystalline solid. The solid is sectioned and each crystal plane is exposed to a hydrogen plasma within helium for 1 minute. The resulting 2D polymer is recovered by dissolving the non-polymerized layers in toluene.

Example 8

1 D polymer polyamic acid polymers using benzopheno-3,3',4,4'-tetracarboxylic dianhydride (BTDA) and 4,4'-diaminobenzophenone were prepared. Upon dissolving BTDA (1 equiv.) and 4,4'-diaminobenzophenone (1 equiv.) in 1:2 v/v MeOH/acetone, the reaction mixture was stirred at ambient temperature for 12-18 h. At the conclusion of the reaction, the volatiles were removed at 45° C. under reduced pressure to result in the desired polyimide product as a yellow powder that is insoluble in common solvents, including DCM and DMSO.

Example 9

2D polyamic acid polymers were prepared using benzopheno-3,3',4,4'-tetracarboxylic dianhydride (BTDA) and melamine. After BTDA (1.5 equiv.) was dissolved in a mixture of MeOH/DMSO, melamine (1 equiv.) was added and the reaction mixture was stirred under reflux for 12-18 h. At the conclusion of the reaction, the volatiles were removed at 100° C. under reduced pressure to result in the desired product as a yellow gel that is insoluble in common organic solvents but can be dissolved in DMSO and water, indicating a possible oligomer formation.

From the foregoing, it can be seen that the present invention describes a series of unique and effective materials, enabling mechanical robustness, planarity, and chemical tailorability with multiple engineering applications. Having described our invention, however, many modifications thereto will become apparent to those skilled in the art to which it pertains without deviation from the spirit of the invention as defined by the scope of the appended claims.

TABLES

TABLE 1

| n | 2D stiffness (N/m) | 2D strength (N/m) | Stiffness (GPa) | Strength (GPa) |
|---|---|---|---|---|
| 1 | 114 | 13.2 | 256 | 29.8 |
| 2 | 92 | 14.9 | 208 | 33.5 |
| 3 | 58 | 14.2 | 130 | 32.0 |
| 4 | 62 | 11.1 | 140 | 25.0 |
| 5 | 50 | 10.2 | 112 | 22.9 |
| 6 | 49 | 8.7 | 111 | 19.6 |
| 8 | 41 | 7.1 | 93 | 16.1 |

TABLE 2

| Fracture property | Units | Graphene | Graphylene, n = 2 |
|---|---|---|---|
| Critical fracture energy | nJ/m | 2.28 | 2.51 |
| Dynamic energy release rate | nJ/m | 6.5 | 12.7 |
| Crack propagation at 300 K | | brittle/unstable | ductile/stable |

TABLE 3

| Shear property | Units | Graphylene, n = 2 | Graphamid, n = 1 |
|---|---|---|---|
| Shear modulus | GPa | 1.6 | 3.677 |
| Shear strength | GPa | 0.317 | 1.446 |
| Shear energy barrier | J/m² | 0.049 | 0.309 |

The invention claimed is:

1. A two-dimensional (2D) polymer comprising:
a regular, repeating, 2D bond network of (i) a plurality of nodes comprised of one or more carbon-containing cyclic nodal units which are joined by (ii) one or more linear polymer bridge units, wherein:
(a) the bridge units are between 0.1-100 nm long;
(b) each node is bonded to 3 or more bridge units;
(c) the bridge units maintain the overall planarity of the 2D polymer, wherein the majority of bonds of the bridge units and their adjacent nodal units are located within a limiting distance measured perpendicularly from a single plane upon which the molecule substantially lies corresponding to three times the length of a carbon-carbon single bond; and
(d) the 2D polymer comprises a single molecule having a length greater than 50 nm in both lateral in-plane dimensions.

2. The polymer of claim 1, wherein the bridge units are capable of inter-molecular hydrogen bonding to other similar 2D polymer molecules.

3. The polymer of claim 2, wherein the bridge units comprise amide, benzoxazole, benzothiazole, benzimidazole or polyhydroquinone-diimidazopyridine molecular units.

4. The polymer of claim 1, wherein the nodal units comprise benzene, borozene, silicene, oxazole, thiazole, or imidazole rings.

5. The polymer of claim 1, wherein the 2D polymer forms a liquid crystal in solution or as a melt.

6. The polymer of claim 1, where the bridge unit comprise one or more polymer, co-polymer, or sub-unit of: polyethylene, p-phenylene terephthalamides, poly-metaphenylene isophthalamides, polyamidobenzimidazole, polybenzoxazole, polybenzothiazole, polybenzimidazole, polyhydroquinone-diimidazopyridine, cellulose, polyamide, polyester, polyimide, polyethylene terephthalate, polyethylene naphthalate, 4-hydroxybenzoic acid, 6-hydroxy-2-naphthoic acid, polyacetylene, polyacrylonitrile, or poly(I-lactid-co-caprolactone).

7. The polymer of claim 1 resulting in a modulus of at least 10 GPa and a strength of at least 1 GPa.

* * * * *